United States Patent [19]
Faudemay et al.

[11] Patent Number: 5,239,663
[45] Date of Patent: Aug. 24, 1993

[54] SELF-ADAPTING AND MULTIFUNCTIONAL PROCESS AND STRUCTURE FOR THE AUTOMATED EVALUATION OF LOGICAL OR ARITHMETIC EXPRESSIONS, PARTICULARLY FOR EXTENDED DATABASE CONSULTATION

[75] Inventors: Pascal Faudemay; Daniel Etiemble, both of Paris; He He, L'Hay-les Roses, all of France

[73] Assignee: Centre National de la Recherche Scientifique, Paris, France

[21] Appl. No.: 930,562

[22] Filed: Aug. 14, 1992

Related U.S. Application Data

[63] Continuation of Ser. No. 366,367, Jun. 14, 1989, abandoned, which is a continuation of Ser. No. 61,642, Jun. 15, 1987, abandoned.

[51] Int. Cl.$^5$ .................. G06F 7/10; G06F 15/403
[52] U.S. Cl. .................. 395/800; 364/222.9; 364/225.4; 364/230.6; 364/232.7; 364/259.1; 364/259.2; 364/271.2; 364/947.1; 364/947.2; 364/974.6; 364/929.2; 364/DIG. 1; 395/500; 395/600; 340/146.2
[58] Field of Search .................. 395/500, 600, 800; 364/200 MS File, 900 MS File; 340/146.2

[56] References Cited

U.S. PATENT DOCUMENTS

| | | | |
|---|---|---|---|
| 3,934,231 | 1/1976 | Armstrong | 364/900 |
| 4,450,520 | 5/1984 | Hollaar et al. | 364/200 |
| 4,451,901 | 5/1984 | Wolfe et al. | 364/900 |
| 4,504,907 | 3/1985 | Manning et al. | 364/200 |
| 4,506,326 | 3/1985 | Shaw et al. | 364/900 |
| 4,716,514 | 12/1987 | Quatse | 364/900 |
| 4,751,635 | 6/1988 | Kret | 364/200 |
| 4,760,523 | 7/1988 | Yu et al. | 364/200 |
| 4,769,772 | 9/1988 | Dwyer | 364/200 |

OTHER PUBLICATIONS

"Multiple Match Resolvers: A New Design Method," IEEG Translations on Computers (Correspondence), Dec. 1974; by G. A. Anderson.
"Design and Analysis of a Direct Filter Using Parallel Comparators" Proc. 4th Int. Workshop on Data Engineering, Grand Bahama Island, Springer ed., Mar. 1985.
"Hardware Organization for Non Numeric Processing," Int. Conf. of Very Large Data Bases, Cannes, France Sep. 1981.
The Database Processor 'RAPID', by P. Faudemay et al. 5th International Workshop on Database Machines.

*Primary Examiner*—Thomas C. Lee
*Assistant Examiner*—Ken S. Kim
*Attorney, Agent, or Firm*—Welsh & Katz, Ltd.

[57] ABSTRACT

Apparatus is described for evaluating an expression comprised of a plurality of subexpressions, each including at least one argument of a corresponding input value. The evaluating apparatus comprises a plurality of resolution modules disposed in an ordered sequence. Each resolution module corresponds to one of the input values and is adapted to perform at least one given function on its input value. Each of a plurality of logical groups of the resolution modules includes at least one resolution module and is related to a corresponding one of the subexpressions. Each resolution module comprises a first input for receiving its input value, a first output, a second input adapted to be coupled to the first output of a previous resolution module in the ordered sequence, a third input for receiving a signal indicative of the position of the input value within its subexpression, and a second output for selectively providing a final value of the subexpression dependent upon the position information signal, the input value, and the first output of the previous resolution module. Each resolution module also includes a logic circuit for operating in accordance with its given function on its input value and the first output of a previous resolution module to provide at its first output a current subexpression value. The position signal determines which of the resolution modules within a logical group is its last resolution module. The last resolution module applies at its first output a nonsignificant signal with respect to the next resolution module of the adjacent logical group of resolution modules.

20 Claims, 17 Drawing Sheets

FIG. 10
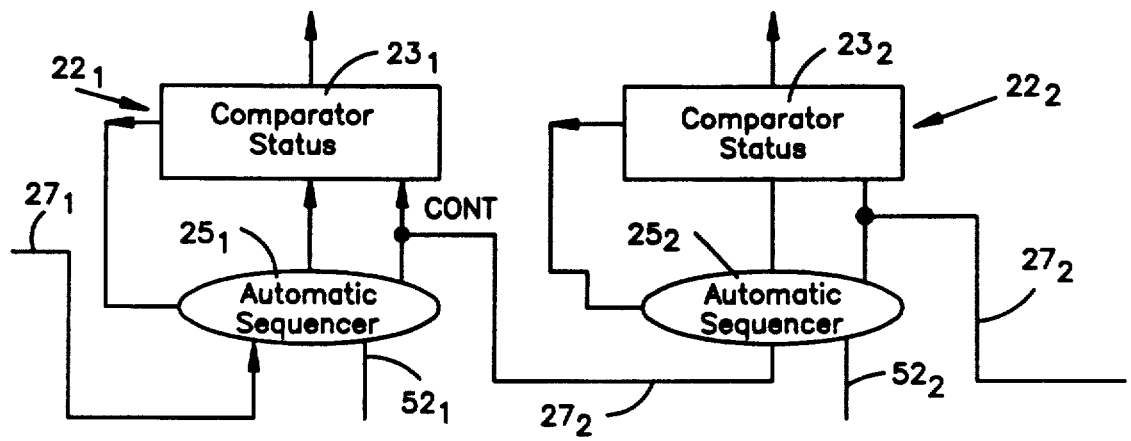
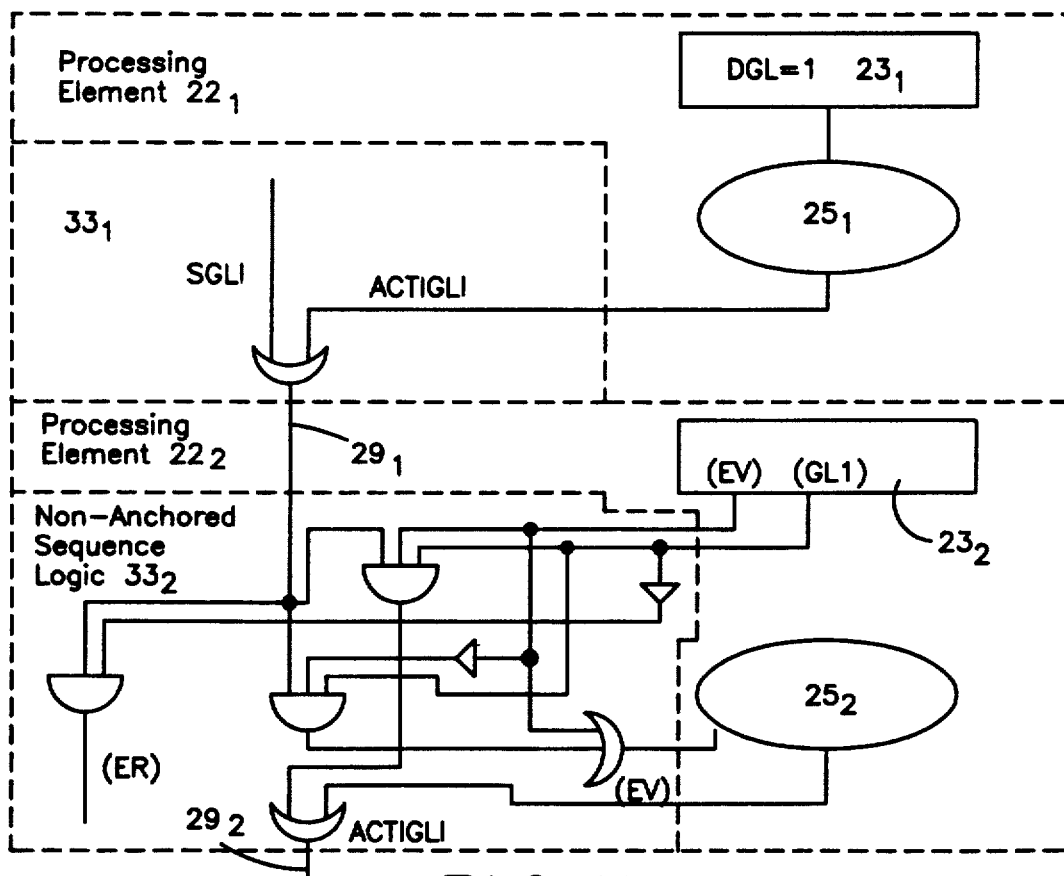
FIG. 11

ASSOCIATIVE MEMORY

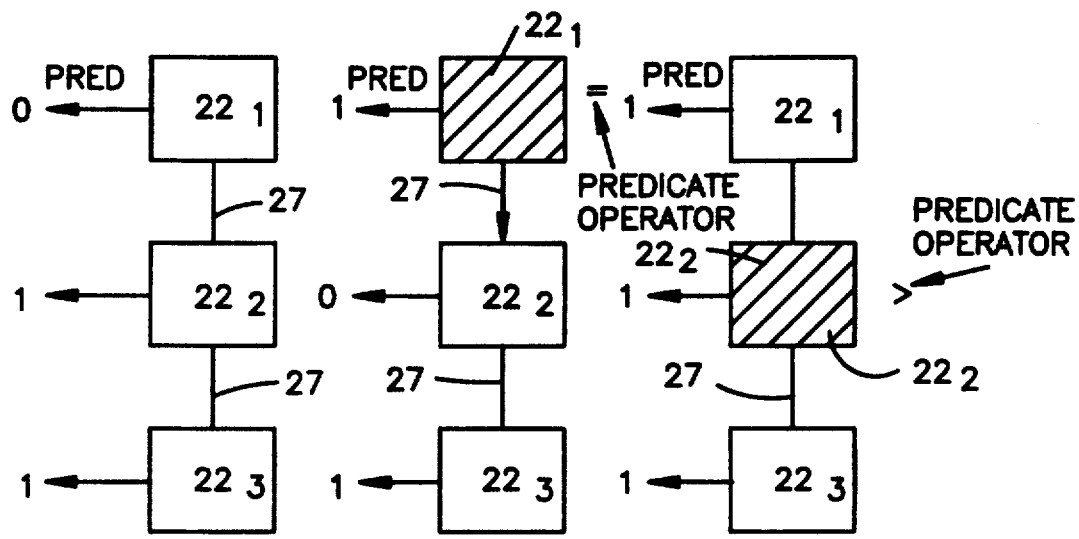
F I G. 21A
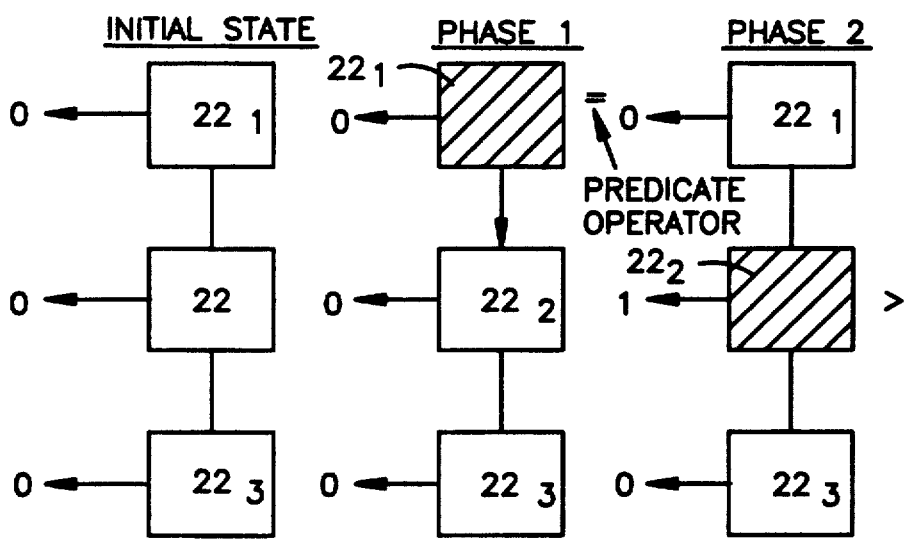
F I G. 21B

SELF-ADAPTING AND MULTIFUNCTIONAL PROCESS AND STRUCTURE FOR THE AUTOMATED EVALUATION OF LOGICAL OR ARITHMETIC EXPRESSIONS, PARTICULARLY FOR EXTENDED DATABASE CONSULTATION

This is a continuation of copending application Ser. No. 07/366,367 filed on Jun. 14 1989, now abandoned, which is a continuation of application Ser. No. 07/061,642, filed Jun. 15, 1987, now abandoned.

ORIGIN OF THE INVENTION

This invention was developed by a team of researchers at the University of Paris VI, France, affiliated with the National Science Research Center (France's foremost public scientific research organization). Some aspects of this invention were revealed in a public presentation in Paris, France, in support of the thesis written by one of the inventors (Pascal Faudemay) for his doctorate from the University of Paris IV, specialty: mathematics; division: computer science. This thesis was published under the title "A VLSI Processor for Database Operations" and is incorporated by reference into the instant patent application.

Copies of this document are available from University of Paris IV at the following address:

Mr. Pascal Faudemay, Laboratoire MASI, Institut de Programmation, Universite of Paris VI, 4, Place Jussieu, 75252 Paris 06.

BACKGROUND OF THE INVENTION

1. Field of the Invention

The invention relates to the field of hardware systems for the rapid processing of database search operations in the broad sense, including assertional updates, in large-scale databases.

In a more general sense, the process and processing structure of the invention are applicable to all automated operations that may be expressed in the form of expressions to be evaluated. For example, applications to arithmetic calculations or to associative memories with variable length records may be cited.

As a specific example, in one of the versions described below, the object of the invention is to evaluate Boolean expressions of the type (A AND B AND C) OR ((D OR E) AND (F OR G)). This expression may, for example, represent a selection query of the tuples of a relation in a database, wherein the letters A, B, C, D, E, F, G represent one of the selection conditions (for example, an equal comparison of a given attribute of the tuple with a constant determined by the operator).

Because the invention was initially designed for the purpose of developing a high performance database processor, it is noted that this invention provides two options in relation to the state of the art:

the option of designing a specialized system with the ability to resolve the stages of database operations (multiple selection, sort, text retrieval, join, projection operations, etc.) which may be expressed in assertional form;

the option of developing a structure and a process which operate in a set-oriented manner, that is, which perform a large number of elementary operations in parallel in a network of interconnected processing modules that may be individually controlled.

2. Description of the Related Art

Several major classes of systems are known for resolving certain database operations. These systems develop algorithms by index construction, sorting, automatic chaining, hashing, cartesian product, or extended selection.

Prior to making the actual calculations, index construction algorithms create an order or a preliminary order on one of the concerned relations or on the operands of the selection predicates. This principle provides for efficient but suboptimal relational selection and join evaluation and for sorting operations. On the other hand, it does not provide for evaluation of text searches and particularly for searching nonanchored sequences, or for detecting rules activated by facts.

Algorithms developed by construction of automatons provide for faster scanning of a tree corresponding to an index and possibly more complex graphs in text retrieval operations. They may therefore be used for processing most database operations. However, their execution implies very high compilation times which makes their use fall far below the theoretical optimum, particularly for joins.

The theoretical optimum is defined as executing query resolution in a processing time which is on the same order as memory access times for accessing useful data.

Hash algorithm systems generally display very high performance for searches using the equal operator but are poorly adapted for selections with operators other than equal and do not provide for management of either sorting or text retrieval operations.

Cartesian product algorithms display a performance inferior or comparable to that of sort algorithms, and therefore fall several stages short of the optimum. Among cartesian product algorithms, for example, systolic algorithms are known which rely on the use of processing elements (PEs) that transfer data to adjacent PEs during each cycle. These algorithms require configurations of all of the PEs of the processor which are specific and different for each operation, or a reconfiguration of the processor through an interface matrix which is an expensive component. In addition, cartesian product algorithms do not provide for text retrieval.

The principle of systematic expression of database operations in assertional form places the system of the invention in a class of database consultation processes which the inventor proposes to call "search by extended selection."

This class of algorithms is partially implemented by associative memories, the use of which has until now been relatively limited due particularly to technological reasons. The operating principle of an associative memory is to search for information according to its content. Operands are stored in a memory, together with an operator ($<, \leq, >, \geq, = <>$) or a function (min, max, sort in ascending or descending order) and a comparison mask. These operands, which may be strings of characters or numbers, are compared to an operand of the same type stored in a special operand register, in this case bit to bit for the min, max and sort operations. The comparison is done in parallel for each operand. The result is a string of operands which verifies the comparison, or of references or addresses of these operands.

Despite its interesting functionalities, this type of processor does not provide for selections using several operators concurrently, for multiple joins, or for controlling attributes whose length is variable or longer than that of the associative memory word, for text selections, or for inter-attribute comparisons. In addition, for applications using operators other than the equal operator, performance is mediocre since the associative memory evaluates one bit during each clock cycle; even with a 20 Mhz internal clock, which is very fast, it would not be possible to achieve throughputs in memory.

The invention nevertheless maintains the principle of using extended selection algorithms for database operations as being the most attractive solution for implementing a high-performance system. In fact, it obviates the need to resort to prior compilation and preprocessing of data, such as indexing, sorting or hashing operations.

In general, the extended selection algorithms developed in designing the invention are based on a principle of "multiple comparisons" within a Boolean qualification expression. Depending on the type of operation performed on the database, Boolean expression resolutions supply one of the following results:

the value "TRUE" or "FALSE" for the Boolean qualification expression (example: selection); or the identifiers of verified subexpressions in the said qualification expression (example: join of two relations, for which the qualification expression is in the normal disjunctive form, and the subexpressions each correspond to one (multi-) comparison the join attributes of a given tuple of the source relation and, in succession—for each new resolution of the qualification expression—each current tuple of the other relation); or the number of verified expressions in the said qualification expression (example: the sort operation within a relation, for which the said qualification expression is in normal disjunctive form, and each subexpression corresponds to a comparison of the sort attributes of a given tuple of the relation, and in succession—during each new resolution of the qualification expression—each tuple of the same relation); or a combination of the three foregoing results.

As an example, a selection operation may be translated into a qualification expression in the form:

$Q = (p_{11} \hat{} p_{12} \hat{} \ldots p_{li}) \vee \ldots (p_{n1} \hat{} p_{n2} \hat{} \ldots p_{nj})$, if Q is in the normal disjunctive form or in the normal isomorphic conjunctive form (priority of or). The selection predicates $P_i$ are in the form $Att_i$ op. $cte_i$, or $Att_i$ op. $Att_j$, where $Att_i$ and $Att_j$ designate the value of the attribute i or j in the current tuple (or of the field i or j in the record) of the relation (file) on which the selection is performed, and $cte_i$ is a constant selected by the user. Op. = [<, ≤, >, ≥, =, <>].

In the case of a join of two relations, the selection predicates $p_i$ will be in the form $Att_i$ op. $Att_j$, where $Att_i$ designates the value of the join attribute i in the current tuple of one of the relations and $Att_j$ designates the value of a join attribute j of a given tuple of the second relation.

In other words, each of the predicates is a logic variable which may assume two states (TRUE/FALSE) depending on whether the comparison it represents is verified or not. Evaluation of the qualification expression then consists of determining whether it is overall in the TRUE or FALSE state, that is, whether the query is verified.

In the example cited, the query result is determined in succession for each tuple of the relation, wherein the value TRUE or FALSE of the qualification expression of the selection determines the way the current tuple will be processed subsequently.

With respect to the architecture of existing systems that provide for extended selection, the closest are those of associative memories and, under certain conditions, the tree circuits for parallel evaluation of non-standard expressions, or the sequential evaluation architecture described in the article "Design and Analysis of a Direct Filter Using Parallel Comparators," Proc. 4th Int. Workshop on Data Engineering, Grand Bahama Island, Springer ed., March 1985.

Existing associative memories 700 are useful for query resolutions consisting of searching for a stored term 701 which is identical to an operand 702, whether it is masked or not masked 703, as shown in FIG. 1. Conversely, as mentioned earlier, systems providing for the use of operators other than the equal operator, or the use of the min, max and sort function are substantially suboptimal. Finally, no known application allows for the simultaneous use of several distinct operators in a single expression to be evaluated.

In the direct evaluation of an expression in a tree as illustrated in FIG. 2, it is necessary to calculate the connector for each node 704 of the tree 718 and to individually transmit it to this node. The addressing of individual nodes substantially increases the complexity of the structure and the number of transistors needed by the node. In addition, up to 50 percent of the comparators 722 may remain idle.

The third known solution, as shown in FIG. 3, is to break down a comparator vector into subvectors 714 with typically a maximum of 30 comparators per subvector. The evaluation is performed sequentially in each of the subvectors. In order to obtain a final evaluation of the expression by extracting the value of each subvector, the maximum size of the subvectors is fixed in the silicon. The result is that when the size of the subexpression to be evaluated exceeds approximately ten predicates, the proportion of comparators used may decrease to approximately 50 percent. Finally, the address of each predicate, that is, the address of the comparator on which it is evaluated, must be calculated at the time of initialization because of the structure's rigidity.

SUMMARY OF THE INVENTION

Consequently, one object of the invention is to provide a structure for the resolution of queries expressed in assertional form, and particularly in the form of an arithmetic or Boolean expression, at a very high operating speed attained by multiplying the number of elementary operations performed in parallel by juxtaposed resolution modules.

Another object of the invention is to provide a structure displaying great flexibility by virtue of its modular and expandable design and due to the fact that the function or functions exercised by each resolution module are reinitialized for each query and may vary from one module to the next.

A further object of the invention is to provide for the optimal use of resolution modules by dynamically partitioning logical groups of modules in the resolution structure to the exact length of the expressions to be evaluated. Consequently, the invention places no limit on the size of the subexpressions to be evaluated, provides for random distribution of these subexpression lengths in the resolution structure and enables direct sequential loading of each expression.

Another object of the invention is to provide for sequential evaluation of the subexpressions by the resolution modules of a same logical group, wherein interconnections between the modules obviate the need for loops.

A further object of the invention is to combine the sequential partitioned structure (defined by the principle of dynamic partitioning of the module groups and their sequential operation), with a final query resolution principle, in a tree structure connected in parallel to all the resolution modules, said tree selectively taking into account the resolution modules which deliver the significant results of subexpression evaluations. As a corollary to this arrangement, the system's evaluation speed is optimized and the query resolution tree may function in a pipeline mode relative to the processing module.

A further object of the invention is to provide for the evaluation of expressions comprising several distinct operators formed of subexpressions nested within each other (for example on three levels, as in the example supplied in the introduction).

Another essential object of the invention is to provide an application of the system for resolution of all costly queries on databases and text bases, that is, of queries whose execution time is a function of the volume of data processed, as well as set-oriented type operations on knowledge bases.

A further object is to supply an architecture for the consultation of databases having extended functionalities and very high processing power, without prior compilation of data, with good resistance to failure, and which may be implemented on VLSI components.

One particularly interesting object of the invention in this respect is to provide a database query resolution architecture which operates in a parallel and set-oriented manner. The operation is parallel inasmuch as the evaluation time for a record of a file, or of a tuple of a relation, is expressed as O (1), that is as a function only of the length of the pertinent field (attribute) and, more specifically, it does not depend on the number of records or tuples compared. In addition, the operation is set-oriented by virtue of its ability to solve a same qualification expression many times in succession, thus without reconfiguring the resolution structure and without loading new constants or new instructions. In the case wherein the predicates of the qualification expression are logical values supplied by processing elements for inter-attribute comparisons, or for comparison of a current attribute and a constant, the configured structure and the PEs previously loaded by a fixed comparison operand, may be used without modification to solve a multiplicity of expressions each corresponding to the broadcasting of the significant attributes of each tuple of the tested relation. This characteristic holds both for selection operations and for join or sort operations. The set-oriented architecture of the invention is particularly advantageous for the two latter types of operations, since it provides for preliminary loading in the comparison PEs associated to the resolution structure, and if the structure is of sufficient length, the attributes of all the pertinent tuples of one of the relations to be joined, or of the relation to be sorted. Each tuple of the other relation to be joined, or of the same relation to be sorted is then sequentially broadcast to all the PEs, so as to solve a qualification expression for each broadcast tuple and to select the joining tuples (joins) or to calculate the order of the current tuple in the relation (sort) as mentioned above.

Another object of the invention is to provide a structure for the assertional consultation of databases by multiple comparisons, providing in particular for controlling the overflow of very long operands onto several comparators, or for controlling selections on databases or text bases of operands with non-anchored sequences, that is, with strings of don't-care characters (including strings containing 0 characters) which are not retrieved for the selection operation, at the user's option. Selections with non-anchored sequences are commonly used in searching terms having prefixes with don't-care characters in text bases.

In accordance with these and other objects of the invention, there is provided apparatus for evaluating an expression comprised of a plurality of subexpressions, each including at least one argument of a corresponding input value. The evaluating apparatus comprises a plurality of resolution modules disposed in an ordered sequence. Each resolution module corresponds to one of the input values and is adapted to perform at least one given function on its input value. Each of a plurality of logical groups of the resolution modules includes at least one resolution module and is related to a corresponding one of the subexpressions. Each resolution module comprises a first input for receiving its input value, a first output, a second input adapted to be coupled to the first output of a previous resolution module in the ordered sequence, a third input for receiving a signal indicative of the position of the input value within its subexpression, and a second output for selectively providing a final value of the subexpression dependent upon the position information signal, the input value, and the first output of the previous resolution module. Each resolution module also includes a logic circuit for operating in accordance with its given function on its input value and the first output of as previous resolution module to provide at its first output a current subexpression value. The position signal determines which of the resolution modules within a logical group is its last resolution module. The last resolution module applies at its first output a nonsignificant signal with respect to the next resolution module of the adjacent local group of resolution modules.

In a further aspect of this invention, each of the subexpressions is related to another subexpression by a selected operator. There is further included a final query resolution tree structure connected to each of the second outputs of the plurality of resolution modules. The tree structure operates on the final values of each of the subexpressions in accordance with the selected operator to provide at its output a final value of the expression.

In a significant aspect of this invention, the logic circuit of at least one resolution module is capable of performing at least first and second functions on its input value. That resolution module has a fourth input for receiving a function selection signal, whereby the logic circuit performs a corresponding selected function on its input value.

In a still further aspect of this invention, each of the logic circuits comprises a first inhibiting circuit responsive to the position signal for inhibiting the application of the final value of the subexpression to its second output. There is also a second circuit responsive to the position signal for inhibiting the application of the current subexpression value from being applied at the first output. There is a plurality of processing elements, each connected to the first input of a corresponding resolution module for loading a corresponding input value therein.

BRIEF DESCRIPTION OF THE DRAWINGS

FIG. 10 illustrates the interconnection logic of the processing elements associated to the resolution structure of the invention, in the case of a comparison overflow onto several processors (or comparators) for assertional database consultation;

FIG. 11 represents an embodiment of the interconnections of the processors associated to the resolution structure of the invention, for the control of non-anchored comparisons during assertional database consultation, in the absence of multiple non-anchored sequences and overflow;

FIGS. 15, 16, and 17 together illustrates in a general fashion a resolution module, and a detailed embodiment of the resolution structure thereof according to the invention using the "non-delayed version" and "delayed calculus" solution;

FIGS. 21A and 21B together illustrate the processor elements control operation associated with the resolution module according to the invention for the control of comparisons with overflow onto several processors, in the context of Boolean qualification expression resolution for assertional database consultation.

DESCRIPTION OF PREFERRED EMBODIMENTS OF THE INVENTION

Sequential Partitioned Structure

Figure 9:
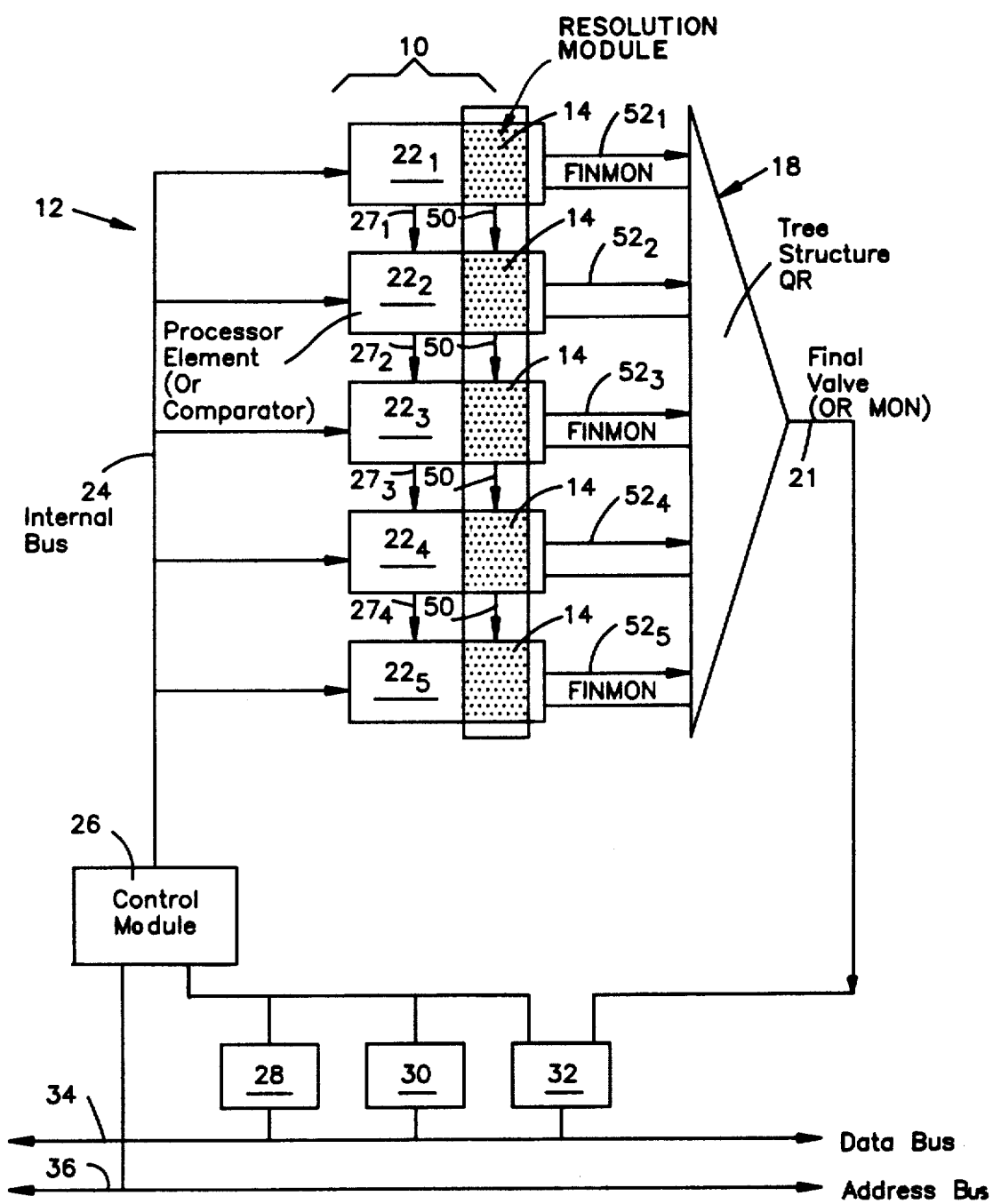
FIG. 9 is a schematic diagram of the general process and structure applicable to all instances of the invention.
Figure 13:
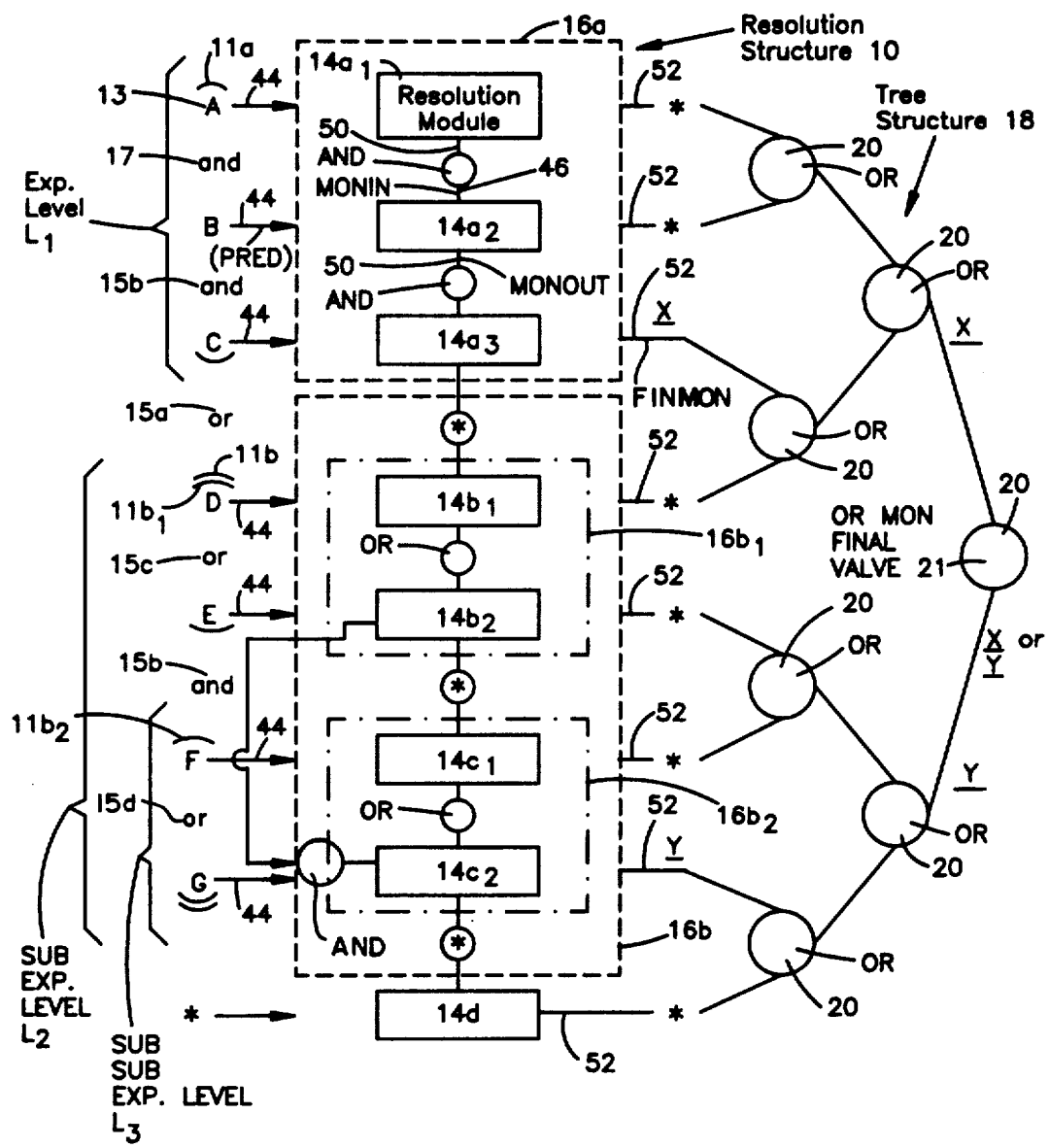
FIG. 13 illustrates the operation of the expression resolution structure and process according to the invention for a Boolean expression of the type (A AND B AND C) OR ((D OR E) AND (F OR G))

The resolution structure 10 according to the invention may be called sequential partitioned evaluation structure (SPS) and is designed to combine, in an original and efficient manner, sequential and parallel evaluations for the evaluation of expressions 11 of the arithmetic or Boolean type, for example. These expressions 11 normally use, as shown in FIG. 13, two operators 15 (for example AND and OR). The sequential partitioned structure breaks down the expression into monomials, in which there is only a single operator, for example (A and B and C). The expression 11 is interpreted with a priority of one of the two operations, for example an OR operator 15a or an AND operator; in the illustrated embodiment of FIG. 13, the monomials are therefore subexpressions 11a and 11b created by the AND priority operator 15a. The sequential partitioned structure evaluates only the monomials 11a and 11b. It outputs in parallel a set of end of monomial values X and Y, on which the other operation is evaluated in a tree structure 18 (FIGS. 9 and 13). This tree may be, for example, a tree of multipliers or of parallel OR gates 20 or of general calculation units.

FIG. 9 illustrates the case wherein the resolution modules 14 are associated to processing elements 22 wherein the latter form means of loading the predicates in the resolution modules 14.

FIG. 13 represents the evaluation of the expression 11 (A AND B AND C) OR ((D OR E) F OR G)) in a resolution structure 10 according to the invention. The first logical group 16a of resolution modules 14a1, 14a2 and 14a3 now evaluates the subexpression 11a (A AND B AND C)=X. The second logical group 16b is formed of two logical subgroups 16b1 and 16b2, such that the subexpression 11b ((D OR E) AND (F OR G))=Y is evaluated in two cycles. Each of the resolution modules 14 comprise a parallel output 52 connected to the final expression resolution tree structure 18. All of the parallel outputs 52 of resolution modules 14 other than the last resolution modules 14a3 and 14c2 of logical groups of a subexpression level L2 are inhibited ("*"). Only modules 14a3 and 14c2 respectively supply the final values X, and Y, for evaluation of the corresponding subexpressions 11a and 11b. The tree structure 18 of the final resolution expression 11 comprises an "OR" connector 20 at each node and supplies the final value at its output 21 of the expression: (X OR Y).

In a more sophisticated version (not shown), the expression 11 comprises n distinct operators 15 and is divided into subexpressions created by the application of the n operator to these subexpressions. In this case, the SPS evaluates the subexpressions; we shall call these "extended monomials" (they are in fact binomials, trinomials, etc.)

The sequential partitioned structure or resolution structure 10 is formed of vector calculus elements, called Monomial Resolution Modules (MRM) 14. Each element of this vector is connected to the next one. Each module 14 receives one of the elementary values 13 of the expression 11—if the expression 11 is in the form *i (+j(Aij)), each module 14 receives one input value 13 (Aij). This elementary input value 13 may be a result delivered by a processing element or comparator 22 (see FIG. 9) associated to each module 14. The monomial value X or Y is evaluated sequentially within a logical group 16 of modules 14 which constitutes a subvector of the resolution structure 10. All of the operators of the expression within the logical group 16, except for the last one, are the monomial operator (that is, the priority operator). The division of the resolution structure 10 into logical groups 16 is thus variable and dynamically initiated at the time the operators are assigned to the resolution structure 10, for a query. Several monomials 11a and 11b are evaluated in parallel by different logical groups 16a and 16b. The sequential evaluation time of a monomial should as a general rule be shorter than the logic cycle time for assignment of expression elements (Aij). In order to evaluate monomials of any length, the machine's logic cycle time may depend on the length of the longest monomial.

The sequential evaluation of a monomial occurs in the following manner. Each module 14 receives the current monomial value output (MONIN) by the preceding module 14, the value 13 of the current element (PRED) and the value of the operator (CONNECT). It transmits the end of monomial value (FINMON) to the parallel evaluation tree 18 and a current monomial value (MONOUT) to the next module 14. For the first module 14a1 or 14b1 or 14c1 of a logical group 16a or 16b or 16c respectively, the monomial value (MONIN) it receives is the neutral value identified in FIG. 13 by an "*" of the monomial operator 15. For modules 14a1, 14a2, 14b1, 14b2 and 14c1 other than the last module of a logic group 16a and 16b, the end of monomial value (FINMON) is the neutral value represented by an "*" of the operator connecting the monomials. The organization of the resolution structure 10 is compatible with the existence of expressions 11 formed with either operator 15.

In the case of multiple priorities (AND or OR), there are duplicates of the resolution structure 10, each of which evaluates one type of monomial. The other duplicate is inactive or its result is considered to be non-significant. Each duplicate of the SPS outputs its result to a copy of the query resolution tree structure 18 (QR) corresponding to the selected priority. The various query resolution trees 18 may be superimposed in a single resolution tree 18, with one output per node and a "PRIORITY" input; as a function of this input, each node 20 then evaluates the operator connecting the monomials as a function of the value of the PRIORITY input.

Figures 4A, 4B:
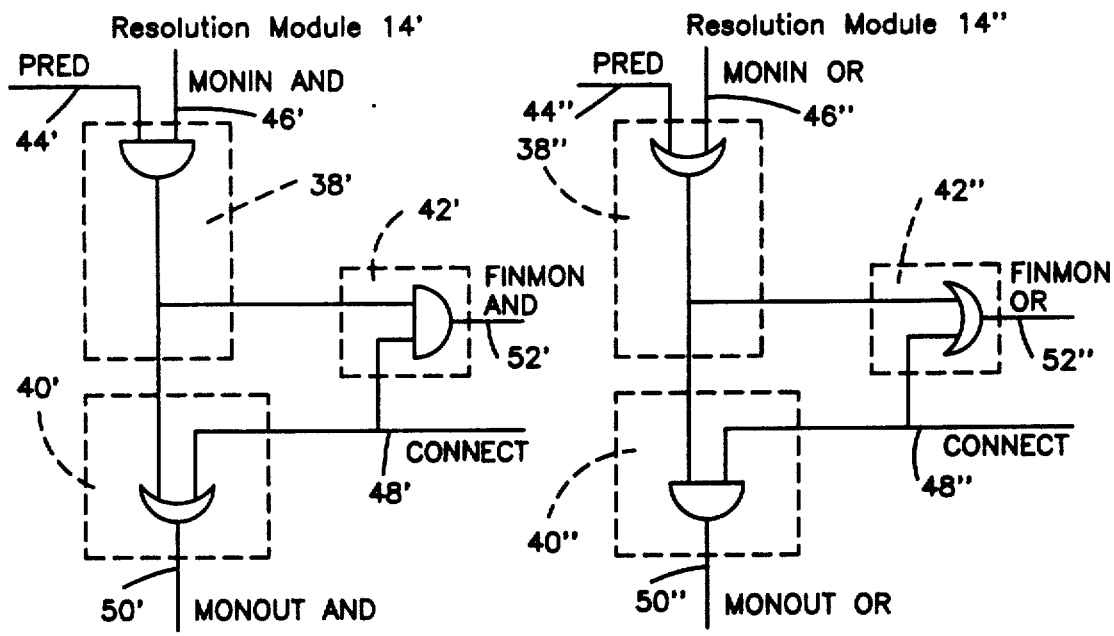
FIGS. 4A and 4B together illustrate respectively distinct resolution modules of the invention for implementing a Boolean subexpression, having chaining elements with priority of "AND" and "OR"

Preferred Embodiments of the Structure According to the Invention for the Evaluation of Boolean Qualification Expressions An embodiment of the resolution module 14 is shown in FIGS. 4A and 4B.

FIGS. 4A and 4B illustrate the resolution module 14 for the automated resolution of queries expressed in the form of logical (arithmetic) expressions comprising:

a) an array comprising a large number of resolution modules 14 connected in series, as shown in FIGS. 9 and 13, of identical structure, each formed of:

i) a processing or chaining element 38 comprising a first input 44 for a predicate or input value 13 (numerical value) of the expression 11 to be evaluated, a second input 46 for receiving a current evaluation result (MONIN) from the preceding module 14a, first serial output 50 supplying a new current evaluation result (MONIN) after chaining the predicate of the processing module logically operating on the input value 13 in accordance with a given function (AND for the resolution module 14 of FIG. 4A as performed by chaining element 38', or OR for FIG. 4B as performed by chaining element 38"), and a second parallel output 52 for supplying the new current evaluation result (FINMON), wherein the modules 14 are serially connected such that the second input 46 of one module 14 is connected to the first output 50 of the preceding module 14 in the series, ii) a first individual logical gate 42 for inhibiting the value (FINMON) of the result supplied at its second parallel output 52 in response to inhibition data (CONNECT) applied at its position information's input 48, iii) a second individual logical gate 40 for inhibiting the value of the result (MONOUT) supplied to the first serial output 50 in response to inhibition data (CONNECT) applied to its position information input 46, b) a processor element 22 (see FIG. 9) for loading the predicates or input values 13 of each expression 11 to be evaluated into each resolution module 14, and connected to the first inputs 44 of the chaining element 38 of the modules 14, c) processing elements 22, as shown in FIG. 9, for generating and applying the connect data to the logical gate 40;

d) final query resolution tree structure 18 (see FIG. 13) connected to the second parallel output 52 of each of the processing modules 14, through the first inhibition logical gates 42 associated thereto, whereby the final query resolution tree structure 18 provides the final evaluation value (ORMON) of the expression 11 to be evaluated.

Figure 7:
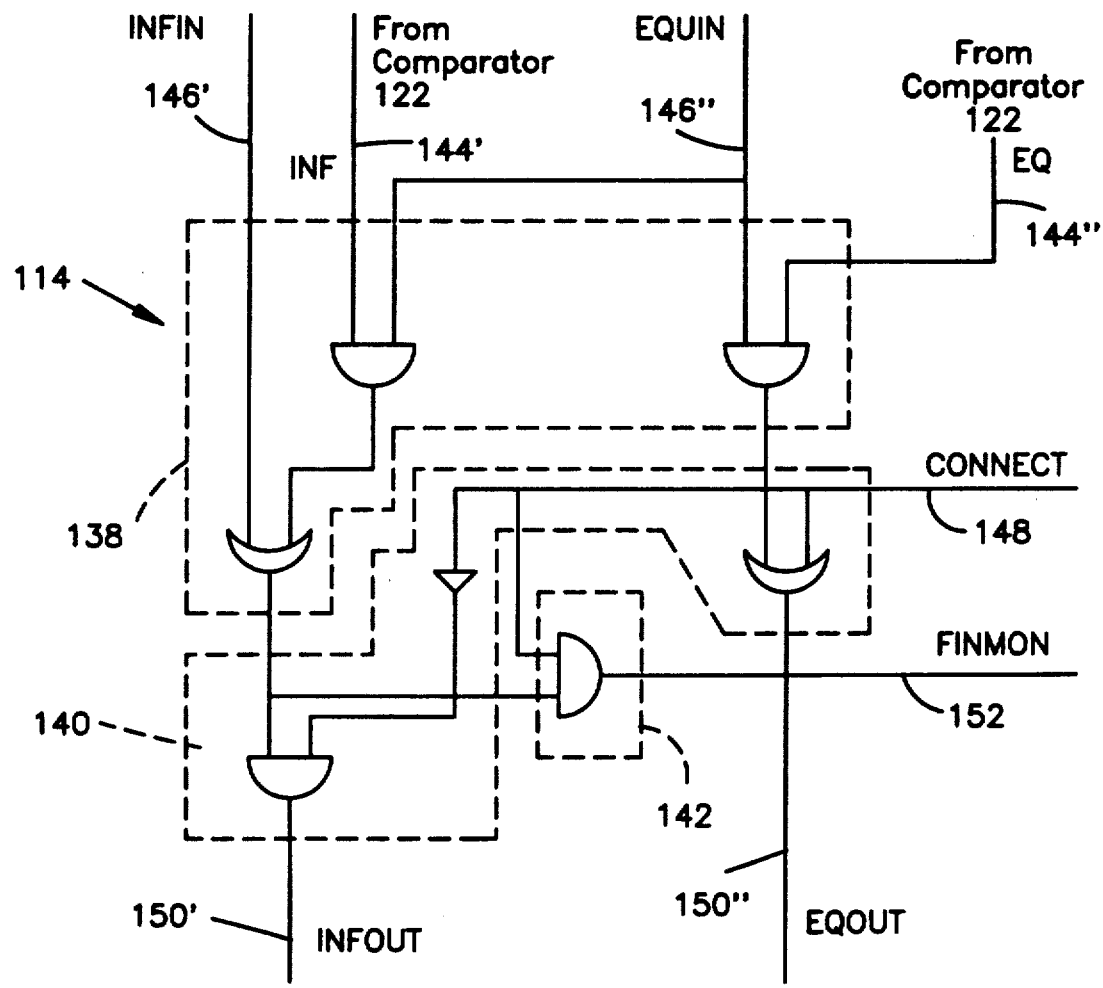
FIG. 7 illustrates an embodiment of a resolution module according to the invention for the evaluation of a subexpression of a Boolean qualification expression for a sorting operation on a database.

It shall be noted that in the embodiment of FIG. 7 wherein like elements are identified by the same numbers but in the 100's series, the input and output signals of each resolution module 114 are duplicated (EQIN, INFIN; EQOUT, INFOUT). This embodiment corresponds to the case wherein the resolution module 114 according to the invention is used for assertional sorting operations on databases. This particular application shall be described in more detail below.

Figure 6:
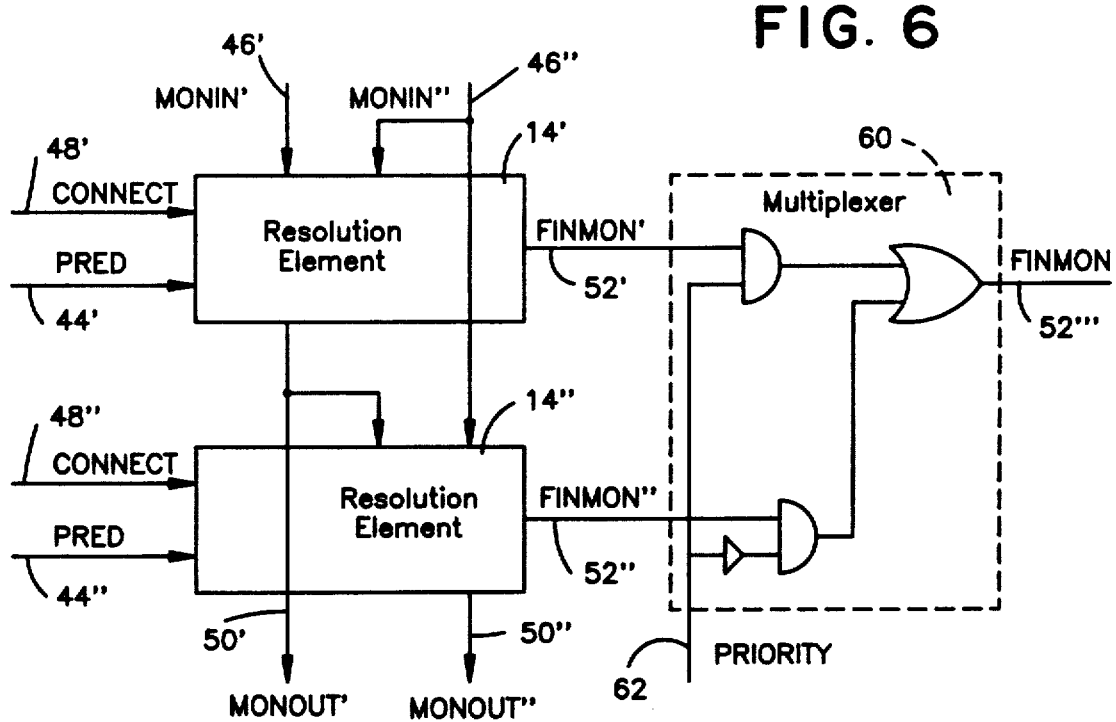

FIG. 6 corresponds to the embodiment according to which the resolution module 14 comprises a first and a second parallel submodules 14' and 14", each formed of a chaining element or logic gate 38, for example of the type shown in FIGS. 4A and 4B. The first and second individual inhibition circuits (not shown in FIG. 6) are in this instance integrated into each submodule 14' and 14", for example in the form shown in FIGS. 4A and 4B. Finally, there is further included a selection circuit on multiplexer 60 for applying at a selected one of the parallel outputs 52' or 52" of the submodules 14', 14" at an output 52'" of the current selected value (FINMON).

Figure 8:
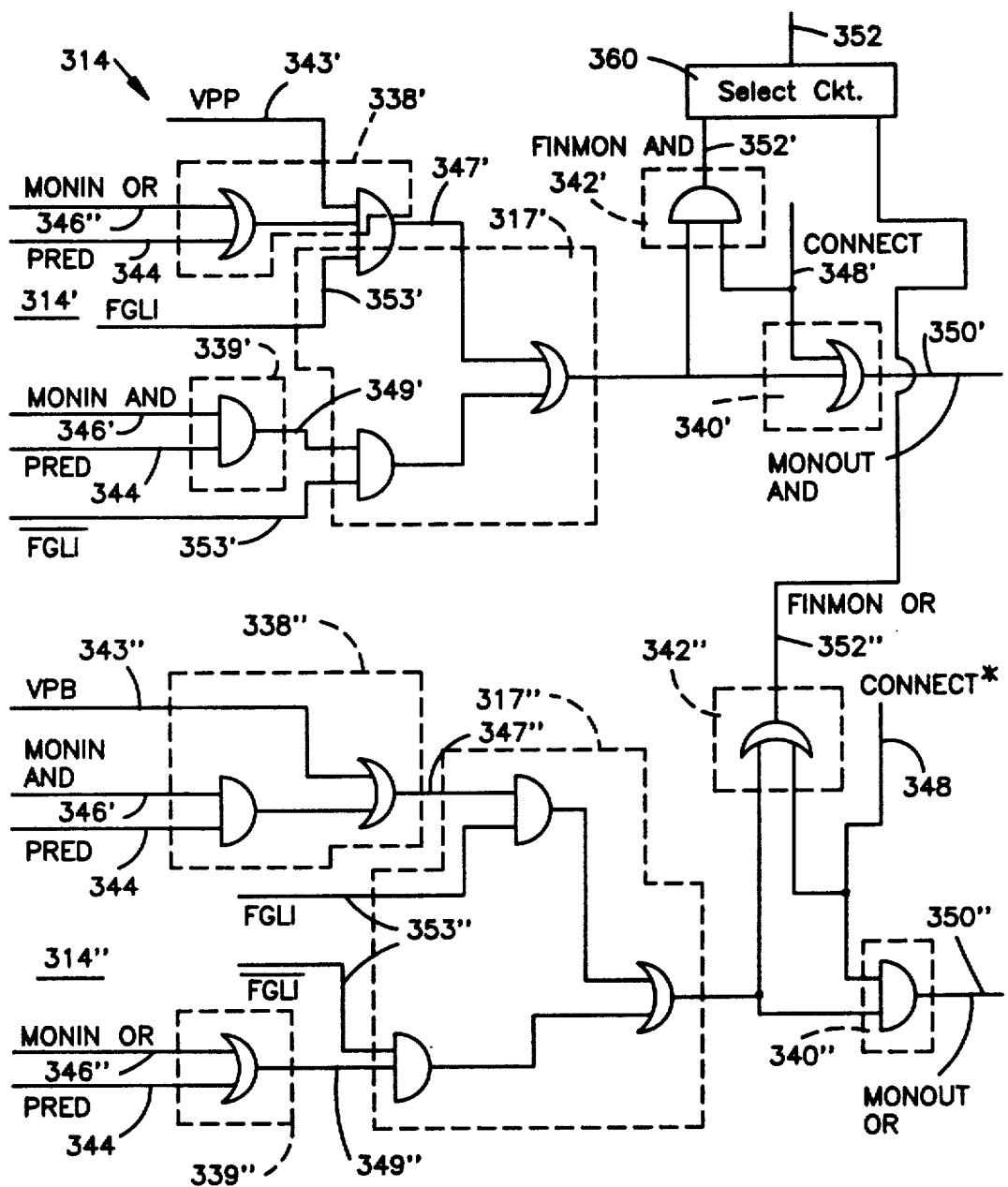
FIG. 8 illustrates a pair of submodules of a Boolean expression resolution structure at two subexpression depth levels. This simplified schematic diagram omits a certain number of logical operating variables (which shall be mentioned below in the description of FIG. 17) and is presented only as an illustration.
Figure 15:
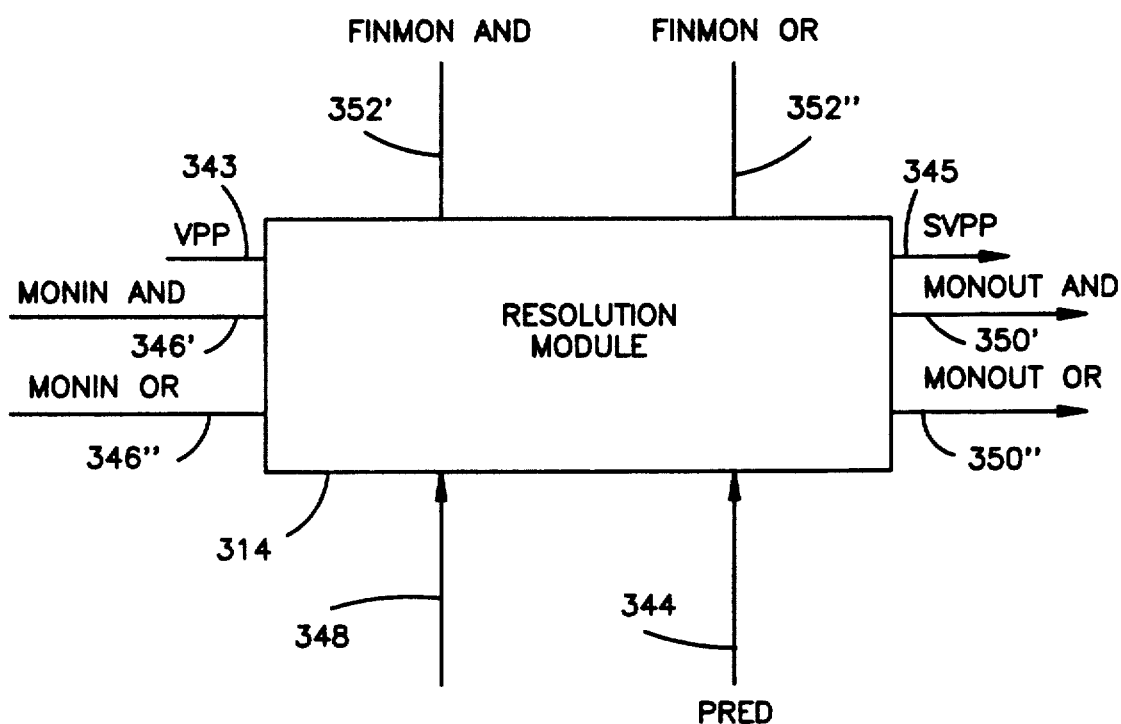

FIG. 8 is a simplified drawing of the "delayed calculus" embodiment of the resolution module 14 of the invention, which is generally shown in FIG. 15 a module 314.

According to FIG. 8, where like elements are identified by the same numbers but in the 300's series, the resolution structure 10, particularly for automated resolution of queries expressed in the form of logical (arithmetic) expressions has two distinct connectors (operators), wherein the expressions 11 (see FIG. 13) to be evaluated are formed of subexpressions (11a and 11b) and possibly of predicates 13 (numerical values), connected by a first connector (operator) 15a of a first level L1, wherein the first level L1 subexpressions 11b are themselves formed of subexpressions 11b1 and 11b2 nested therein and possibly of predicates (numerical values) connected by a second connector (operator) 15b of a second level L2, wherein the second level L2 subexpressions are in turn formed of predicates (numerical values) connected by a third connector 15c (operator) of level L3, wherein the level L1 and L3 connectors are of the same type, and of the type opposite that of the level L connector, wherein the level L1 and L3 subexpressions 11a and 11b are evaluated by an array of resolution modules 14 and the final evaluation of the expression is performed in parallel by a final query resolution tree 18, wherein the resolution structure or apparatus 10 comprises:

a) the array of a large number of serial resolution modules 314, each formed, as shown in FIG. 8, of two parallel submodules 314' and 314", wherein each of these submodules 314' and 314" is dedicated to a chaining operation or logical function through a distinct connector (AND, OR), and comprising:

i) a first chaining element 339, 339", comprising a first input 344 for receiving the value (PRED.) of a predicate 13 of the expression 11 to be evaluated, a second serial input 346', 346" for receiving a current evaluation result (MONIN AND, MONIN OR) from the submodule of the same type as the preceding resolution module 314, and an output 349', 349" for supplying a first new current evaluation result of the current subexpression;

ii) a second chaining element 338', 338" comprising a first input 344 for the value (PRED.) of the predicate of the expression to be evaluated, a second serial input 346', 346" for receiving a current evaluation result from the submodule of the opposite type in the preceding resolution module 314 in the series, a third input 343', 343" for receiving the current evaluation result equal to the current value of a preceding subexpression of level L2 in the series, and an output 347', 347" for supplying a second new current evaluation result of the current subexpression, iii) a selection circuit 317', 317" for selecting the current evaluation result of the current subexpression for the submodule 314', 314" comprising a first input for receiving the first new evaluation result from the first chaining element 339', 339", a second input for receiving the second new evaluation result from the second chaining element 338', 338", a third input 353', 353" for receiving information (FGL1) on the position of the resolution module in the logical group of resolution modules of the current subexpression, a first serial output 350', 350" for supplying the current selected serial result and a second current selected parallel output 352', 352" for supplying the result (FINMON AND, FINMON OR), iv) a first individual inhibition logical gate 342', 342''' of the value of the result supplied to the second parallel output 352', 352" of the submodule, loaded with inhibition data CONNECT for resolution modules other than the modules loaded by the last predicate of a second level L2 subexpression;

v) a second individual inhibition logical gate 340', 340" of the value of the result supplied to the first serial output 350', 350" of the submodule, loaded with inhibit data (CONNECT) for the processing modules loaded by the last predicate of a third level L3 or second level L2 subexpression;

wherein each of the modules 314 is serially connected such that the second serial input 346 of the chaining elements 339', 339 , 338 , 338" of each submodule 314', 314" are appropriately connected respectively to the first serial output 350 of the first and second preceding submodule 314', 314", through the corresponding second inhibition logical gates 340', 340", b) processor elements 22 (see FIG. 9) for loading the predicates 13 of each expression 11 to be evaluated associated to each resolution module 314, and connected to the first inputs 344 of the cleaning elements 338', 338", 339', 339" of the modules, c) processing element 22 (FIG. 9) for generating the said information received by the said first and second individual inhibition means 340, 342, d) a final query resolution structure 18 connected to the parallel outputs 352 of the resolution modules 314, wherein the final query resolution tree structure 18 supplies the final evaluation value of the expression to be evaluated.

e) the processor 22 for generating the information the position of each module in the logical group for resolution of the current subexpression.

f) a selection circuit 360 for selection of the result supplied in parallel for each submodule 314', 314", to supply a parallel module result on the parallel outputs 352', 352" of the module.

Figure 14A:
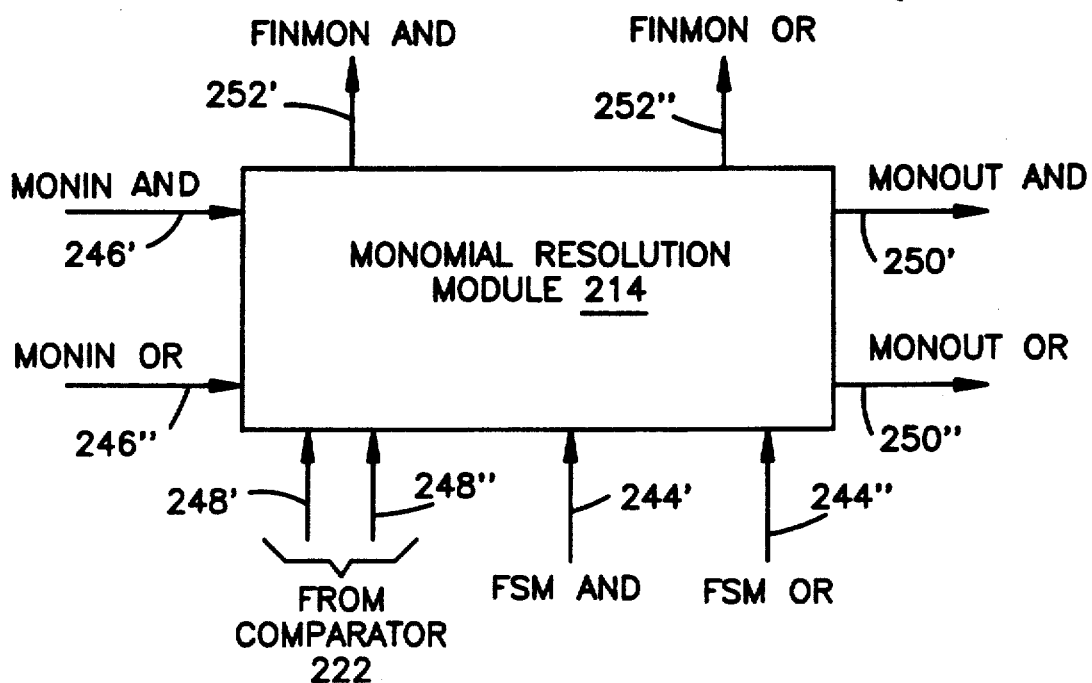
FIGS. 14A, and 14B together illustrate respectively in a general fashion a resolution module and a subresolution module
Figure 14B:
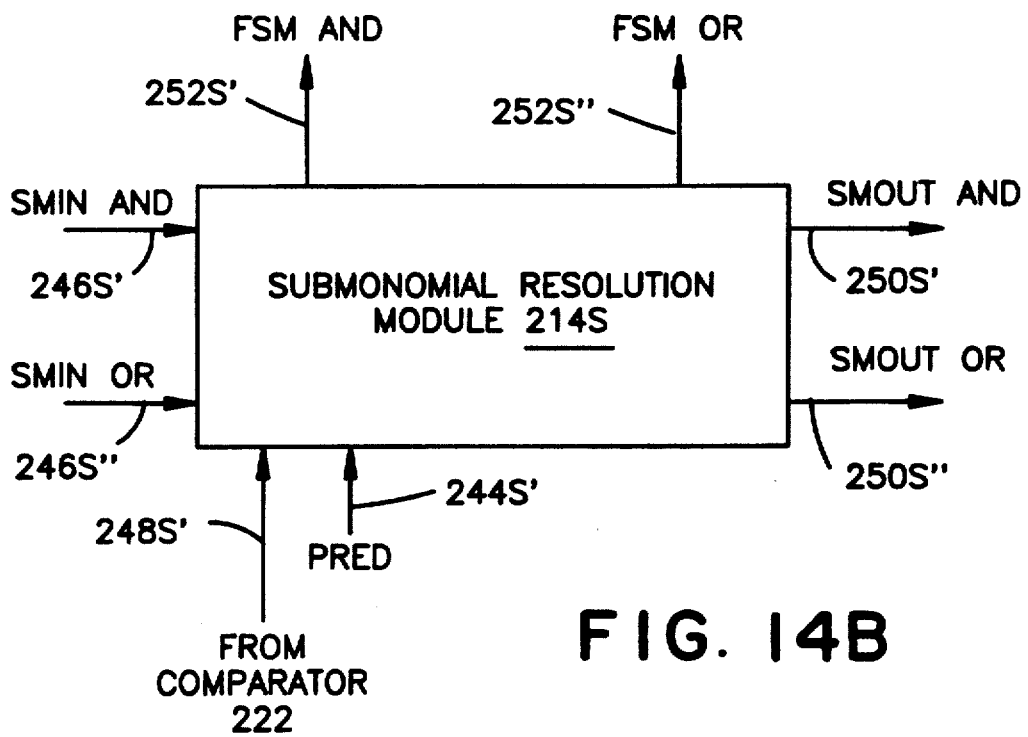
Figure 16:
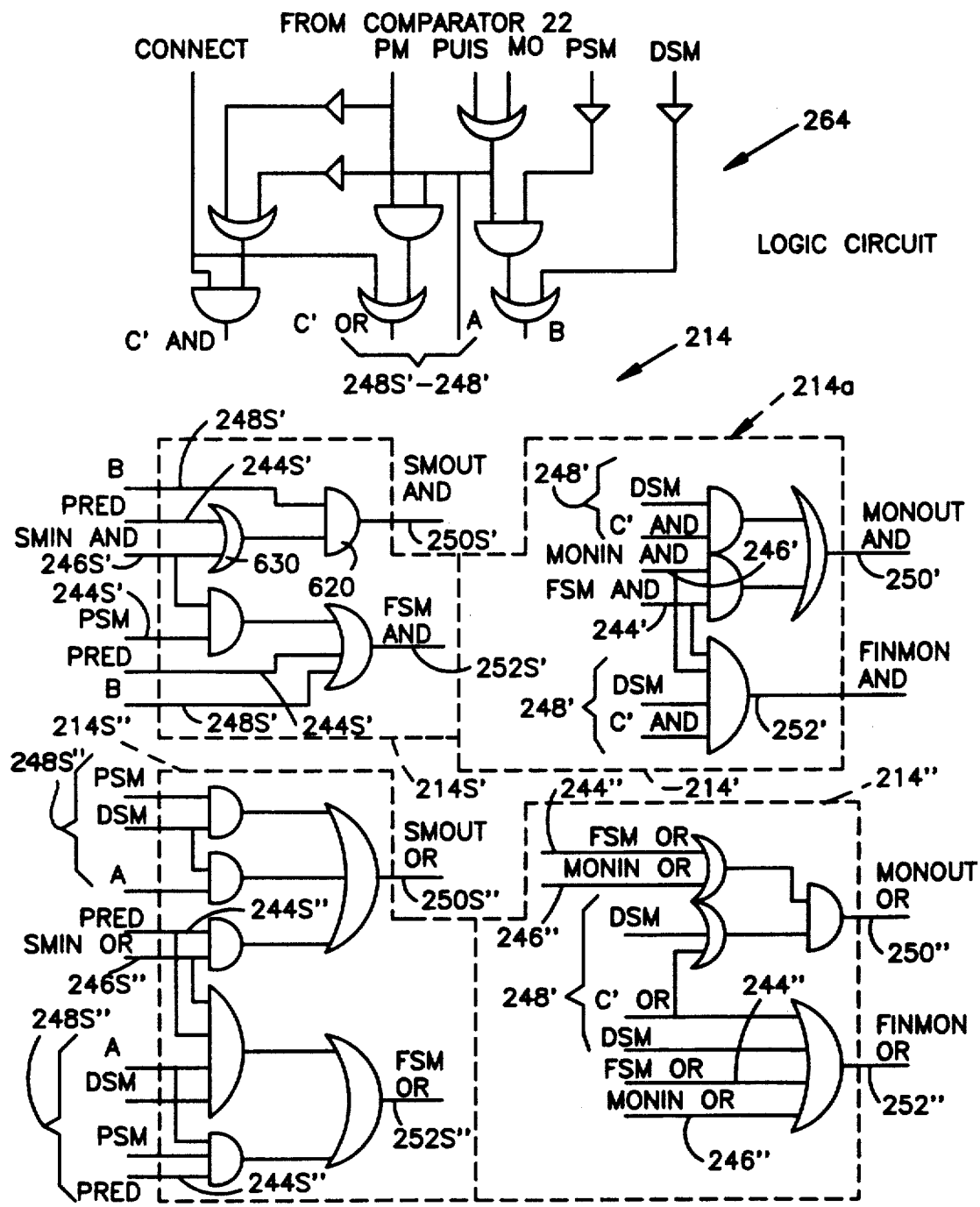
FIG. 16 illustrates a detailed embodiment of the resolution structure thereof according to the invention using the "non-delayed calculus" solution.

A second embodiment of the resolution structure or apparatus according to the invention applied to the evaluation of subexpressions at several depth levels, is shown in FIGS. 16, 14A and 14B, wherein like elements are identified by like numbers but in the 200's series.

According to this embodiment, the resolution structure 10 see FIG. 13 is applied to the automated resolution of queries expressed in the form of logical (arithmetic) expressions 11 having two connectors (operators) 15a and 15b, wherein the expressions 11 to be evaluated are formed of subexpressions 11a and 11b and possibly of predicates (numerical values), connected by the first connector (operator) 15a of the first level L1, wherein the first level L1 subexpressions are themselves formed of subexpressions 11b1 and 11b2 and possibly of predicates (numerical values) connected by the second connector 15b (operator) of the second level L2, wherein the second level L2 subexpressions 11b1 and 11b2 are in turn formed of predicates (numerical values) connected by a third connector (operator) 15c of a third level L3, wherein the first and third levels L1 and L3 connectors 15a and 15c are identical to each other and different than the second level L2 connector 15b, wherein the evaluation of first and second level L1 and L2 subexpressions is performed by an array of resolution modules 14 (see FIG. 13), 214 (see FIG. 16) and the final expression evaluation is performed in the parallel final query resolution tree 18 (see FIGS. 9 and 13).

Figure 2:
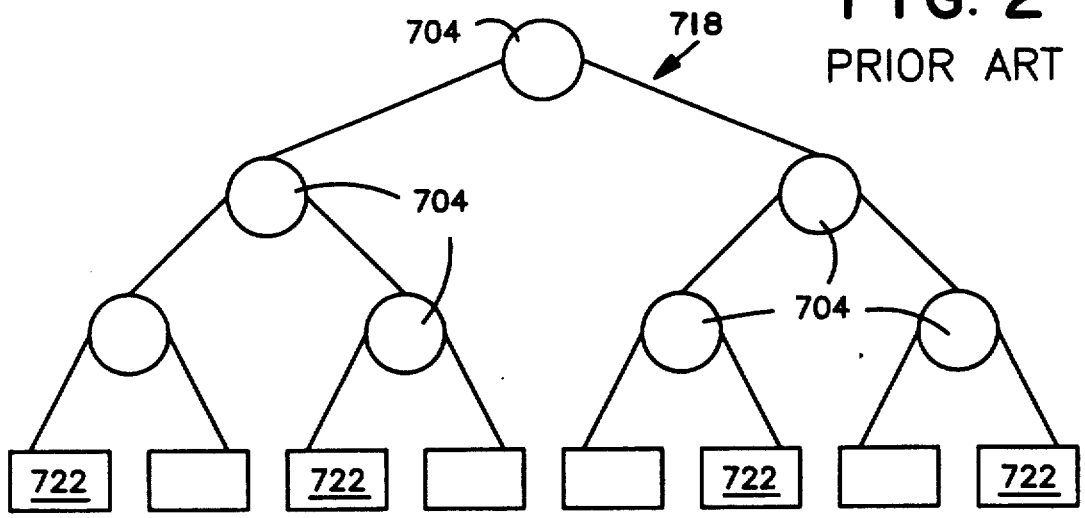
FIG. 2 illustrates a known architecture of a tree circuit providing for the parallel evaluation of non-standard expressions.

The structure comprises:

a) the array formed of a large number of serial resolution modules 214, each formed of two parallel submodules 214a and 214b, wherein each of the submodules is dedicated to a chaining operation or performing a logical operation using a separate connector 15b or 15c for each subexpression level L2 or L3, and each of the submodules 214a and 214b is formed of two parallel logic resolution layers or set of resolution elements, wherein the first layer or set is assigned to integration of the second level L2 subexpressions 11b to supply the final evaluation results of the second level L2 subexpressions, and the second layer or set is assigned to integration of the third level L3 subexpressions 11b1 to supply the final evaluation results of the third level L3 subexpressions, wherein each of the logic layers or sets comprises:

i) a resolution element 214', 214S', 214", 214S" comprising a first input 244', 244", 244S', 244S" for the value PRED., FSM AND, FSM OR of a predicate of the expression to be evaluated, a second serial input 246', 246", 246S', 246S" for receiving a current evaluation result (MONIN-AND, MONIN-OR, SMIN-AND, SMIN-OR) from the current subexpression evaluated by the logic layer, a first serial output 250', 250", 250S', 250S" supplying a new current evaluation result (MON-OUT-AND, MONOUT-OR, SMOUT-AND, SMOUT-OR) of the current subexpression after performing its logical function on the predicate, and a second parallel output 252', 252", 252S', 252S" for supplying the new current evaluation result (FINMON-AND, FINMON-OR, FSN-AND, FSN-OR), wherein the modules 214 are serially connected such that, for each submodule 214a and 214b, the second serial input 246', 246", 246S', 246S" of each layer are connected to the first serial output 250', 250", 250S', 250S" of the layer of the same level in the submodule having the same connector or performing the logical function in the preceding resolution module 214 in the series, wherein each resolution element 214', 214" of the first layer or set additionally comprises a third input 244', 244" for receiving a final evaluation value of a third level L3 subexpression 11b1 (see FIG. 13), wherein the third inputs 244' and 244" are connected to the second parallel outputs 252S', 252S" of the second level L2 layer of the same module 214.

ii) a first individual inhibition logical gate for inhibiting the application of the value of the result supplied to its second parallel output 252', 252", 252S', 252S", in response to inhibition data for each module logic layer other than the module logic layers loaded by the last predicate of a subexpression of the same layer as the logic layer, iii) a second individual inhibition logical gate for inhibiting the application of the value of the result to its first serial output 250', 250", 250S', 250S" in response to inhibition data for the logic layers of resolution modules supplied by the last predicate of a subexpression of the same level as the present logic layer, and for the second level L2 logic layers of modules which do not receive a predicate intended for the second level L2 logic layer, b) a processing element 22 (see FIG. 2) for loading the predicates (PRED) of each expression to be evaluated associated to each resolution module 214, which are connected to the first input 244S' of the corresponding module 214, c) a set 264 of logical gates for generating the information received by the first and second individual inhibition logical gate d) a final query resolution hierarchical tree 18 connected to the second parallel output 252 and 252" of the resolution modules 214, through the first inhibition logical gates associated thereto, wherein the final query resolution tree 18 provides the final evaluation value of the expression 11 to be evaluated.

It is noted that in the case of the embodiment of FIG. 16, the first input 244S', 244S" for the value of a predicate to be evaluated of the first level L1 layers are intermingled with the third inputs 244', 244" which receive the final values for evaluation of the second level L2 subexpressions from the second level L2 layers.

It is also noted that, as opposed to the simplified embodiment of FIG. 8, the functional embodiment of FIG. 16 does not distinguish logic circuits belonging to the chaining element (resolution element) from those belonging to the individual inhibition means. However, the function of each inhibit signal PM, PUIS, MO, PSM, DSM, A, B, C' (as shown in FIG. 16) shall be explained below.

Application 1 of the Structure of The Invention: Database Processor (DBP)

The resolution structure 10 according to the invention may be used to implement a database processor (DBP) 12 as shown in FIG. 9. Such a DBP 12 has been designed by the inventors under the name of the "RAPID" database processor.

Figure 5:
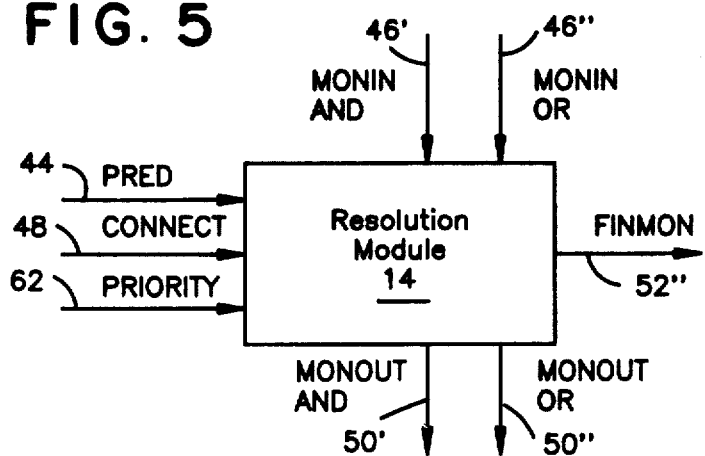
FIGS. 5 and 6 together are respectively a general diagram and a more detailed diagram of an embodiment of a resolution module according to the invention comprising two submodules, wherein each is dedicated to a distinct connector.
Figure 18:
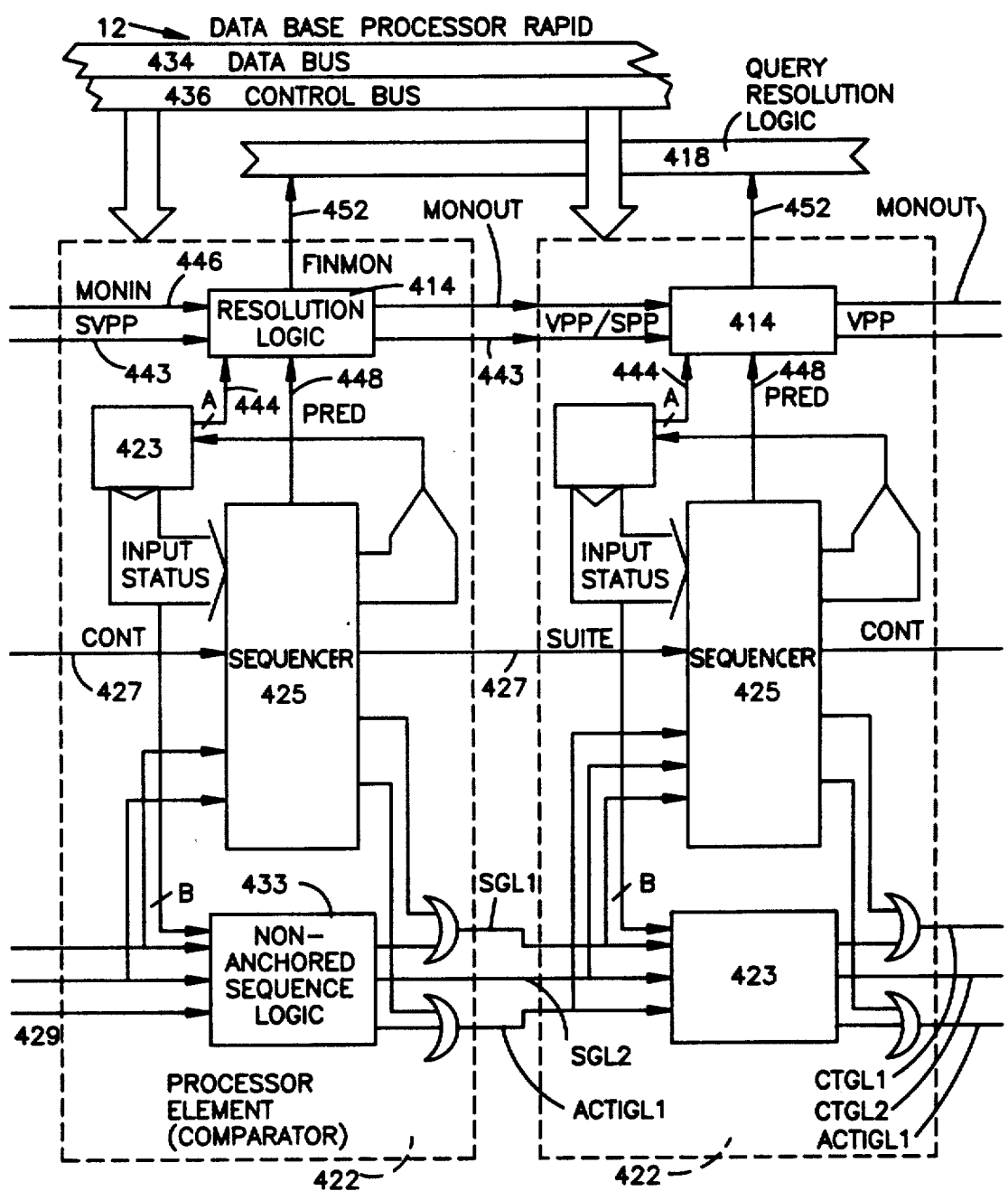
FIG. 18 is a schematic drawing of the overall interconnections between the processor control logics, the processors and the expression resolution structure according to the invention in an embodiment of the invention for assertional database consultation.

In the database processor 12, each predicate 13 as shown in FIG. 13, is evaluated by a processor element or comparator 22. The value PRED of this predicate, which is TRUE or FALSE, is supplied to a monomial resolution module 14 associated to the processor element 22. The expression 11 which connects the predicates (PRED) is a Boolean expression. In this expression, the operator 15 is a connector represented by the CONNECT data: [and, or], or in a variation, CONNECT: [and, or, then]. The "then" is a special case of "and" processed by the processor element 22 and by special interconnection tracks 27 as shown in FIG. 10, or 427 as shown in FIG. 18 (see below). The monomial resolution module 14 associated to each processor 22 comprises two elements. One evaluates the monomial with priority of "and" 14' as shown in FIG. 6a and FIG. 6, the other with priority of "or" 14" as shown in FIG. 4b and .FIG. 6. There exists a specific MONIN input 46 and MONOUT output 50 for each of these two elements, MONIN and MONIN', MONOUT and a MONOUT'. Accordingly, each MRM 14 delivers two distinct end of monomial values, FINMON and FINMON' (one for each of the two priorities) or a single FINMON (as seen in FIG. 5) value corresponding to the priority selected by the user.

In the database processor, the resolution structure 10 can function in pipeline mode in relation to the processor elements 22 vector. This is allowed because in general, results output by the resolution structure 10 (FINMON) are not used in processor 22 sequencing and, more significantly, in other parts thereof. In one instance, the FINMON value associated to the processor 22 constitutes an input of the processor sequencer as shown in FIG. 10, or 425 in FIG. 18. In this event, the predicate calculation circuit 23, 423 as shown in FIGS.

10 and 18 in the processor 22 and the resolution structure 10 operate in pipeline in two distinct cycles, but the processor sequencer 25, 425 is activated to complete the processor cycle only at the end of the second physical cycle at the earliest. Thus, there is no loop in the pipeline operation.

In the case of the RAPID database processor 12, a monomial of "and" priority may also contain a predicate for inclusion of a string preceded by a non-anchored sequence (that is, by a string of don't-care characters). In this case, the inclusion predicate is broken down into an "or" submonomial of inclusion predicates. This possibility may be considered to be the expression of an "OR of AND of OR," which delivers the binomial values "AND of OR." Similarly, it is possible to process "AND of OR of AND," which deliver the binomial values of "OR of AND" in a delayed version described below. This binomial control system will use an SVPB track 343 as shown in FIG. 15, or 443 as shown in FIG. 18, which broadcasts the value of the "OR of AND" binomial before the start of the "and" submonomial, corresponding to the MONOUT value of the preceding "and" submonomial value in the expression. The advantage of evaluating an expression in this form is that it enables combination of the "or" priority, which is advantageous for text retrieval, and of the "and" priority, which is appropriate for relational attribute searches. For example, in EXP = (A or B or C) and (D or E) and ((F and G) or H and I)), A or B or C are synonyms for a concept searched for in a text, (F and G) is one of the alternative conditions searched in the relational attributes. In this case, the SPS goes beyond parallel monomial resolution to solve the subexpressions, for example to a parenthetical depth of 1.

Functionalities of the DBP Selection Operation

The objective is to find the tuples (records) of a relation (file) which verify a qualification expression 11 of the form:

$Q = (P11 \char`\^ P12 \ldots P1li) \vee \ldots (Pn1 \char`\^ Pn2 \char`\^ \ldots Pnj)$ (where $\char`\^$ and v represent the operators AND and OR), if Q is in disjunctive normal form, or the equivalent in conjunctive normal form (priority of "or"). The selection predicates Pi are in the form Att_i op cte_i, or Att_i op. Att_j, where Att_i and Att_j designate the value of the attribute i or j of the current tuple (or of field i or j in the record). Op = [<, ≤, ≥, =, <>].

Predicates of the form 'f(Att_i) op g(Att_j)" may also be part of a general selection expression, one example being "find the names of all company employees who receive a bonus greater than 0.3 times their salary." These predicates should preferably be processed using the specialized operators, like the other predicates of the qualification expression. However, this does not justify the introduction of a multiplier or of a general processor in the component. The functions f and g shall thus be calculated in a coprocessor, wherein the processor 22 only performs a comparison in the form "Att'_i op Att'_j". The notation "Att'_" here signifies that the attribute value is modified by a microprocessor before it is processed by the processor 22.

Half-join

This involves finding all of the tuples of the relation S whose attribute S.Aj is equal to a value of the attribute .Bk of the relation R. Or R X: $S = \Pi_A(S.Aj = R.Bk)$, where Π is the symbol of projection of X: of the half-join. Let [$b_m$] be all of the values of R.Bk. This half-join may be treated as a selection of S by a qualification expression in the form $V_i(S.Aj = b_m)$.

Join

The natural join of R and S on the attributes R.Ai and S.Aj consists of finding all of the tuple parts formed of a tuple of R and a tuple of S such as R.Ai = S.Aj (equal join). More complex expressions having several attributes of two relations and an '=' operator or operators other than '=' (unequal join) may also be processed by the processor 22. For example, it may be necessary to evaluate pairs of tuples such as R.Ai1 = S.Aj1 and R.Ai2 > S.Aj2.

This operation may be broken down into two phases:

a) select S by an or of the set of values of R.Ai. Obtain as a result for each tuple of S the monomial references of Q which are verified. These references determine the list of tuples of R which join with the current tuple of S.

b) concatenate the current tuple of S with the first tuple which joins from R (or associate their identifiers for subsequent concatenation), to form a first result tuple, then with the second one, and so forth.

The purpose of the specialized database processor 12 is first to determine the joined tuples pairs, that is, to execute phase (a). It ends in a compacted form of the intermediate result called "join index" in an earlier document [Valduriez, P., "Optimization of Relational Operators in Database Machines, State Thesis, Paris, Sep. 85 (VALD85)]. Phase (a) may or may not be interlaced with phase (b), depending on whether this phase is executed after evaluation of each tuple of S or of all Ss. In a second cycle, the processor will also complete phase (b).

Sort

Sorting is not a relational algebra operation, but it is commonly requested for presentation of results. In this instance, we propose to sort using the database processor 12 presented herein. The sorting operation may be broken down into two phases:

a) calculation of the tuple vector array based on the sorting order. This vector may be the "sort vector" in the APL sense, whose sort function provides this type of result [see the previous publication, Iverson, K., "A Programming Language," Wiley, 1966].

b) shifting the tuples to arrange them in the sort vector order.

According to the approach followed for the join, phase (a) of the computation is executed by the database processor 12 and phase (b), wherein the data are shifted in memory may be executed by a separate microprocessor (not shown). Calculating the vector array is done by counting the number of tuples less than or equal to (for sorting in ascending order) the current tuple. For this calculation, a disjunctive qualification expression is created, wherein each monomial is the condition "att_i1 > $b_{j1}$ then att_i2 > $b_{j2}$, then, etc." where "att_i1" is the first sort attribute, etc., and [$b_{ji}$] is the set of all values of attribute i in the relation. This monomial is equivalent to the subexpression "att_i1 > $b_{j1}$ or att_i1 = $b_j$ and att_i2 > $b_{j2}$ etc." as explained for the overflow control logic. The calculation thus involves evaluating the number of verified monomials in the qualification expression. If a bit set to 1 is associated to each conjunctive true monomial in the operator, the result is the sum of these bits. It will be shown subsequently that this addition uses a tree structure 18 (see FIGS. 9 and 13) which receives end of monomial values, as in the join and selection operations.

The preceding result is a partial sequence and not a complete sequence as in the APL sort vector. If a complete sequence is needed, a simple solution can be reached through software. The complete sequence is reestablished at the end of the sort operation by the user program, which updates a number of tuples for each array. When the vector array is formed, it is scanned by the program; each time it encounters an array with a collection of $n>1$, the array is reduced by $n-1$ and the size is reduced by 1. This solution is inexpensive, particularly if there are few duplications.

Selection in Texts

Text retrieval may be viewed as an ordinary selection which also includes:

a skip character (don't-care character) which is by definition equal to each character of the current tuple or of the constant;

a then connector which is verified in Pi then Pj if the character string which verifies Pj is located in the tuple following the character sequence which verifies Pi;

a contain operator which is verified in "att_i contains bi" when the bi sequence is present in a random position of the attribute, possibly followed by a string of random characters.

This operator is generally defined as the search of "Att_i bi," where bi=*b'i*". * is the skip of a random number of characters (or non-anchored sequence). It is also possible to search for "*bi" (suffix) or "bi*" (prefix).

Complexity in text retrieval is primarily caused by suffix searches. This may be viewed as the evaluation of one or of several constants equal to bi, wherein the search for bi begins each time its first character is encountered in the evaluated attribute [see the prior document: Pramanik, S., "Hardware Organization for Non Numeric Processing," Int. Conf. on Very Large Data Bases, Cannes, Sep. 81 (PRAM81)]. The maximum number of occurrences of bi which may be concurrently evaluated is the number of occurrences of the first character, or of the first memory word, in bi.

The resolution structure 10 also provides for performing character searches in an interval (a functionality which exists for example in the TED editor) with the preceding functionalities, due to the existence of "$\leq$, $\geq$" operators and of the then connector. However, we have provided for its direct evaluation in the form of an evaluation of classes of characters by the processor 22.

Another possibility is to weight each predicate and to evaluate the sum of the weights rather than a Boolean function of the predicates. In RAPID, the weight is associated to a monomial and constitutes a field of the monomial identifier for text retrieval.

It may also be advantageous, in deduction applications, for the processor to search trees in parenthetical form in a text. This would enable the processor to be applied to semi-unification [see Rohmer, J., Terral, D., PRC-BD3 Seminar, Nov. 85 (ROHM85)]. The problem of trees searches may be viewed in the following manner. A text is to be searched for "alpha(*a*,*b*)*" where "*" is the skip character (don't-care character), but a and b are not to be searched at the same level in the tree (or have a given difference in level). This is the same as defining a special skip character, which shall be designated as "(*)", such that the number of left and right parentheses encountered during the skip are equal.

Similarly, we shall define "(*" and "*)" where the number of right or left parentheses is greater than one. The implementation of this tree search and other possibilities related to semi-unification with the type of processor presented here appears to be relatively simple, it shall be incorporated into the description of the DBP's functional architecture.

Protection

The projection of a relation R (file) on attributes Ai1, ... Ain (field), designated Pai1 ... ain(R), consists of creating a target relation, R', which is deduced from the source relation while maintaining only the attributes Ai1 ... Ain. This generates duplicate tuples. The expensive part of the operation is eliminating the duplicate tuples ("unduplication") which makes it a "difficult" relational operation.

This operation may be seen as an equal join of R with itself, on the array of its attributes, or a "self-join" with tagging of the join tuples.

According to the invention, one advantageous method of embodiment of a projection comprises the following stages:

The Query Resolution Logic

For selection, the query resolution logic is formed of monomial resolution modules 414, which are distributed among the various processor elements 422. As seen in FIG. 18, each processor element 422 comprises an identical resolution module 414 performing in parallel AND and OR operations on their inputs. These parallel AND and OR operations are performed on each component comprising various processor elements 422 between the results of monomials belonging to a same component, giving a result ANDMON and ORMON per component, and performed according to an elementary tree architecture 418 between the results ANDMON (and ORMON) of each component or group of components, which gives a result ANDMON and ORMON for the processor.

The parallel AND and OR operations performed external to the processor component by the tree architecture 418, are processed on one board, which shall be designated "connection component" or auxiliary component, and whose patterns are connected in a tree structure. The database processor is therefore necessarily formed of two distinct types of components, but the second is very simple. For the joins, the AND and OR tree held in each main component and by the auxiliary components is done throuqh a double binary tree interface which propagates the inhibition bit of the multiple response resolution; some of these binary trees are internal to the main component, the nodes located closest to the root are each situated on a pattern of the auxiliary component. Finally, for the sort operation, this structure is supplemented by a tree of adders in parallel, one part of which is also internal to the main component and the remainder of which is held in the structure external to this component. The leaves of this adder tree receive at their input 452 the "monomial result" bits (FINMON) which form one of the outputs of each processor 422. These leaves are each formed of a microcircuit which counts the number of outputs set to 1 on a group of 4 or 8 FINMON outputs 452 for example; the nodes of the tree are parallel adders with n or fewer bits, where 2n is the maximum number of comparators in the processor; initially, a value of $n<16$ seems reasonable.

Within the main component, the number of adder bits of this structure may vary or may be determined by the maximum number of processors 422 in the component. Initially, 8 bit adders are perfectly adequate; in the tree structure 18 of each component, they replace certain processors (less than ⅛ of the total number). In the auxiliary component, they all have the same number of bits for the sake of simplicity. This component is thus formed of an OR, an AND, a node of the propagation tree of the inhibition bit and of a 16 bit adder, and possibly of amplifiers. Several nodes of the tree may be grouped together. In addition, the auxiliary component may be organized such that it constitutes a propagation element of the internal bus of the processor and of each component, if it is organized in a tree structure because of the card's geometry. Nevertheless, the degree of integration of the auxiliary component is much lower than that of the main component, and it could probably initially be made as a semi-custom component or gate array.

Finally, it should be noted that the adders of the resolution tree introduce few constraints on the processor specifications. However, during the sort operation, the evaluation time of a tuple must always be at least equal to that of an elementary addition, which can be achieved by adapting the cycle time during the sort operation or introducing wait states in the control module 26 in FIG. 9, since the sort functionality is viewed as a complementary functionality whose performance is of secondary importance; in fact, sorting will be used in our algorithms only for presenting results on the screen, and performance would in any event be adequate for this purpose. When sorting tuples of sufficient lengths, for example of more than 8 bytes, which is very small, the speed of the adders should not slow down evaluation time; for smaller tuples, we accept a certain loss of optimal performance of the processor used as a sorter. Because there are no major constraints imposed by the query resolution sorting operation, in the description below we shall primarily concentrate on the query resolution structure applied to selection operations.

For selection operations, the query evaluation logic 12 generates a TRUE or FALSE result of the expression, stored in the output port 32 (see FIG. 9) of the processor 12 (see FIG. 9 and FIG. 18), as a function of the value of p PRED' bits each associated to a processor 22 (see FIG. 9) or comparator module 422 (see FIG. 18), of p CONNECT bits corresponding to input 48 in FIGS. 4A and 4B and a PRIORITY bit corresponding to the input 62 in FIGS. 5 and 6 stored in the status register 423 (output line A in FIG. 18) of the processor 422 and of each component (in the case of a single component processor, this bit is only internal to the component). The CONNECT bit contains the value, and in case of "and" priority, this is the normal operation for selection and half-join operations, and the value or in case of "or" priority (normal selection in text retrieval).

The resolution logic 12 comprises a part 414 in FIG. 18 corresponding to monomial resolution module, associated to each comparator 422; this distributed logic communicates with that of the preceding comparator module and that of the following module. It receives from the preceding module the MONIN bit (preceding value of the monomial) and transmits to the next the MONOUT bit (current value of the monomial). Assume an expression Q=(P1 and P2 and P3) or (P4 and P5 and P6), wherein each predicate is evaluated by a comparator 422. The MONOUT bit of comparator 5 is at TRUE if P4 and P5 are true. In this case, the MONIN bit of comparator 6 is also at TRUE. For the last comparator of a monomial, the value of MONOUT does not depend on the monomial value; it is at TRUE in case of and priority and at FALSE in case of or priority. The same rule of course also applies to MONIN for the first comparator of a monomial. These bits thus provide for sequential evaluation of each monomial, wherein each may be evaluated in parallel with the others.

In addition, part of the resolution logic 12 is a tree logic 18, wherein each leaf receives a bit FINMON (output line 452 in FIG. 18) of the distributed logic of a comparator: this FINMON bit indicates, at the end of a monomial, that the value of FINMON is at TRUE in case of or priority, or at FALSE in the reverse case. The tree logic 18 performs a parallel and and or of each monomial value transmitted by FINMON. Each node of the tree transmits to the next higher level two bits, ANDMON and ORMON, which correspond to these two values. The result of the query is ORMON in case of "and" priority, ANDMON in the opposite case. The selection is made by a discrete component in the case of a multi-component processor and is made within the component in the case of a single component processor.

The fact that the monomial value is evaluated serially, for example by an and of the PRED bits in the case of and priority, provides for evaluation of large size monomials (10 to 40 predicates with a processor cycle equal to a 40 ns clock cycle, more with a processor cycle comprising several clock cycles, at the user's option), without loss of comparators. This is essential because the number of comparators determines the processor performance just as it determines speed. The fact that the or (or the and) of the monomials is evaluated in parallel provides for evaluation in a minimum time of an almost random number of monomials and therefore of predicates. Indeed, in operations with a very large number of predicates, such as half-joins, the monomials always have only a small number of predicates and they become very large in number (whenever possible, this is the number of tuples in one of the source relations).

DBP Architecture

The architecture of the database processor 12 is illustrated in FIG. 9.

Introduction

The database processor 12 is characterized by a functional architecture wherein all of the data are broadcast via bus 24 to all of the processing elements 22 or comparator modules. Each comparator recognizes the data intended for it according to the attribute identifiers broadcast on the bus 24. Each comparator 22 is connected to the next one such that it also activates a remote comparator 22 located to the right (that is, having a higher order in the comparator vector). A sequential monomial evaluation logic formed of resolution modules 14 in an ordered series distributed on each comparator 22, also uses the connection 59 with the next comparator 22. Finally, the query resolution logic, which supplies the general extended selection result (FINMON), is a tree structure 18 with comparator modules as leaves or nodes 20. In the broad sense, we shall speak of query evaluation logic as including monomials resolution.

The overall database processor 12 may be described in a first approach without reference to the join and sort operations which constitute extensions. It thus forms a simple database processor 12 similar to a comparator filter. The multiple response resolution (expression of one comparator 22 at a time broadcast on the bus 24) makes the processor 12 a member of the family of associative memories.

The inputs and outputs of the automatic sequencer 25 in FIGS. 10 and 11 associated to each comparator 22 comprise all of actions which characterize the comparator 22 state changes.

The database processor 12 comprises four parts: a control module 26 which initializes the processor, controls the operations and generates on time the attribute numbers and the end of attribute and tuple bits; a "comparators" part formed of p parallel comparator modules 22; this part delivers p PRED bits, each containing the value TRUE or FALSE of the predicate evaluated by each comparator 22; a subexpression resolution logic part comprising an array of resolution module 14 in an ordered series; each resolution module 14 delivers a parallel output 52 (FINMON) as a result of the evaluation of a subexpression 11a or 11b. Finally, a part in the form of a tree structure 18 with leaves are connected to the parallel outputs of resolution modules 14, for selection and half-join operations, a parallel and and or on the array of comparators 22; for these operations, this part 22 delivers a TRUE or FALSE result (PRED) for each tuple evaluated.

The comparator 22 (or for the sake of simplicity, the comparators) are therefore organized in a vector to which a data word an a few control bits are delivered by way of bus 24 during each operating cycle. In addition, each comparator 22 receives from the preceding comparator 22 and sends to the following comparator 22 a small number of bits, with propagation occurring in a single direction (from comparator O to comparator p-1). For a join operation, as explained below, an additional bit is propagated from one comparator 22 to all of the following comparators 22 by tracks. Because of its structure, the comparator vector may be formed of several comparators 22 in one component, or of several components forming a single comparator vector. These then receive from the preceding component and send to the following component the same information as the individual comparators. One of the control modules 26 may then become the master module for part of the control operations. The structure of the processor 12 is thus both regular and expandable. The only limit to expansion is the number of transistors per component and of components per card--and potentially of cards per machine. Propagation times are a factor only in limiting the length of the monomials (that is, the number of predicate values in the expression to be evaluated) to a very acceptable value. This limit is not written in the silicon. It may be removed if longer operating cycles comprising several clock cycles are accepted.

The database processor 12 operates without compilation. This is an essential characteristic in relation to the various selection and join processors using compiled automatic sequencers or indices. The elements (Predicates and operators) of the qualification expression 11 (or the appropriate source relation for the half-join) are written into the processor 12 in a certain order, without prior calculation or modification, for example for address management in the processor 12. It is interpreted by the user program as a "controller," with one or more addresses for data to be written by way of an input port 30, and an address for data to be read from the processor in an output port 32 for the results. One possible configuration of the input port 30 is to comprise in fact two addresses, one for a STATUS register 28 of the processor 12, defining a small number of commands thereof, the other for a data input or address register 30. Although it is an input port 30, the STATUS register 28 will also be readable to check its contents and certain status bits of the control module 26. Internal addresses will be definable by writing an address onto the data register and an appropriate status word. However, these addresses will serve only for testing the comparators 22 and possibly for making some of them idle. The externally accessible addresses consist only of comparator numbers which are defined logically (for reading/writing in an operand memory) and the status registers (STATUS) 423 in FIG. 18 or 23 in FIG. 10 of the comparators 22. In normal operation, these addresses are managed by the control module 26. For this module 22 and from the exterior, the operand memories of the comparator 22 are each interpreted as a single address, or as a shift register, wherein the internal addresses are controlled only at the comparator module level.

In a subsequent version, the database processor 12 will function as a database "coprocessor." In a conventional manner, this processor 12 will inhibit the main processor while it is operating and reactivate it at the end of a processing phase. The data written in the specialized processor at the beginning of a calculation will contain the starting address of the page containing the qualification expression (or containing the list of its pages) or the start of the current data page and a page result address. The tuple shifts would then be entirely or partially controlled by the database processor 12—at least writing the tuples of the source relation in the processor, controlling the pointer on the end of result list, and perhaps for selecting duplication of some of the tuples in the result page (see FIGS. 8 and 9). These functions control module (MC) functions.

Each comparator 22 evaluates a predicate (PRED) of the qualification expression 11, after transforming those predicates whose operand is too long into a predicate sequence. These contain a local memory which stores the operand, the comparator control bits (STATUS register 423 in FIG. 18 or 23 in FIG. 10) and the predicate operator code, which is represented as the operator of the predicate (=,>,< . . . ); the operator code is interpreted externally as a part of STATUS register 23 to simplify loading. They also contain a comparator which can be viewed as a part of the sequencer 425 in FIG. 18 which gives a result of "<," ">," or "=" for each comparison of a data word and an operand word; the comparator 22 is always active; it operates on 22 bit words (16 data bits and 6 redundance bits or special character bits in the illustrative case of the RAPID processor) depending on the length of the word reserved for the processor 22. An automatic sequencer 25 in FIG. 10 or 425 in FIG. 18 sequences the operation of the comparator 22 and incorporates word comparisons into comparisons on the entire operand. There is also a counter containing a pointer on the current operand word, an operand length counter which broadcasts an end of operand bit, a parenthesis depth counter (in the "word processing and knowledge base" version), a simplified decoder which compares the word broadcast onto the bus 24 to the comparator number, and at least five registers: a left register containing an operand word, a right register containing a data word read on the bus, a latch register for initialization, a register containing a monomial identifier and the operator code register mentioned earlier; mask registers may be used for binary attribute comparisons. All of these elements are described in the above noted Faudemay thesis. The most important elements from a space standpoint are the operand memory 19 of FIGS. 20 and 21, the comparison unit and the sequencer 25, whose characteristics largely determine processor performance, and the internal bus 24, which comprises the bits corresponding to a memory word, as well as control bits.

There are also tracks 427, 429 connecting each comparator 22 to the preceding one and the next one (FIG. 18). There are three or four such tracks at the comparator input, depending on the version, and three or four at its output, plus three additional tracks in the word processing version:

CONT 427 activates the next comparator 422 (at its input in a comparator, this bit is called "then").

Option

Figure 3:
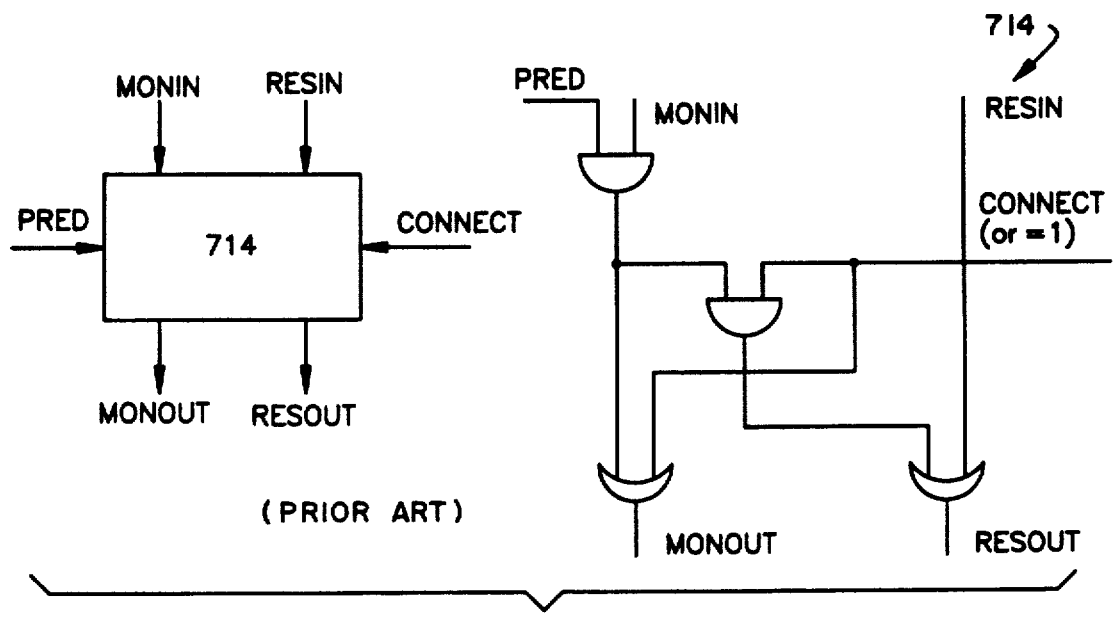
FIG. 3 is a diagram of a known architecture for sequential evaluation.

An alternative embodiment of the resolution module is identified by the numeral 114 in FIG. 3, wherein reference numbers correspond to the reference numbers of FIG. 6 but in the 100's. INF 144 is an input of the resolution module 114, which is dedicated to a sorting operation, and indicates a final result of "<" for the preceding comparator module 122; this bit is used for sorting. The INFIN track 146' corresponds to the input in the resolution module 114 of the INF result of the preceding comparator 122, INFOUT 150' transmits the INF bit to the next comparator 122;

EQ 146' indicates a result of "=" for the preceding module 122 and is also used for sorting; as in the foregoing, EQIN 146" and EQOUT 150" are also present.

INFIN, INFOUT, EQIN, EQOUT exist only in one of the processor versions corresponding to one of the possible solutions to the problem of comparisons distributed onto several comparators 122 as shown in FIG. 7 or 22 in FIG. 9. If they do not exist, they may be replaced by two tracks, which inform the next comparator that the CONT signal 427 (see FIG. 18) is due to an overflow; this information may be needed for the loading phase and in all instances MONIN 446 and MONOUT 450 tracks of FIG. 18 transmit the current monomial value from each comparator 422 to the next respectively from each resolution module 414 to the next in the ordered series.

ACTIGLI (at the output) and SGLI (at the input) are used in text retrieval. CONT and ACTIGLI are part of the sequencer outputs 25 in FIG. 10, SUITE and SGLI to its inputs.

three interconnection tracks, CONTIGLI1, CONTIGLI2, and CONTIGLI3 429 provide for complete processing of a non-anchored sequence search in a text with priority of "and" or "or" in the selection expression, at the user's option.

Application of join, projection, sort and text retrieval operations in the structure of the invention Join To join the relations R and S (wherein R has a smaller number of tuples than S), the tuples of R whose join attribute is equal to that of the current tuple of S are found. For each of these tuples, we seek to obtain a tuple identifier or at least an identifier of the comparator 22 of FIG. 9 in which its join attribute is stored. This should be possible even when the number of comparators 22 used to compare each attribute of R is variable, or in the case of a multi-attribute comparison. In the case of a single attribute join, each comparison performed by a comparator or processor element 22 of an attribute of R with the current attribute of S appears as the evaluation of a predicate (PRED) in the form "cte=attr_i," where "cte" is a value of the join attribute of R. These predicates (PRED) may be viewed as the elements of a disjunctive expression 11: when the result is TRUE, there exist tuples of R which join with the current tuple of S.

The operation will therefore consist of sequentially by way of the bus 36 of FIG. 9 writing into the database processor 12 the join attributes of tuples of R, then sequentially transferring the joint attributes of S by way of bus 36b in FIG. 9 to allow for a parallel comparison respectively in each loaded processor element 22 of each one to all of the join attributes of R by the comparators 22. If the tuples of R (or their join attributes) fit in the processor 12, the operation is performed by a transfer of the join attributes of each relation. When this limit is exceeded, the complexity of the join is here in O(N2), but this limit may be multiplied by a very large coefficient with the use of machine architectures or adapted DBMS environments.

The problem is to identify the list of predicates of Q verified by the current tuple of S. This functionality is an extension of that which characterizes an associative memory. In this one, a single operator (operator of comparison between two attributes) is defined for the global memory. The results supplied by the associative memory are references of the memory words which verify this operation relative to the word stored in the input register. The operation of our processor in associative memory corresponds to the case wherein the operators of all the predicates are identical. It is therefore an extended associative memory. It displays several special characteristics. It has multiple attributes, multiple operators, it is organized in logic records of random length, it delivers an identifier of the logic record and not a predefined address or value. Finally, it is a "serial word/parallel record" memory as opposed to the common "parallel word/serial bit" concept.

To determine the monomial identifiers which are verified, the principle is based on a single TRUE comparator 22 writing its identifier on the bus 36 in FIG. 9 during a cycle. For this, an INHIBIT bit shall first be propagated to all of the comparators located to the right of the first comparator 22 for which the end of monomial value (FINMON) delivered by its resolution module 14 associated is true. Propagation may be linear, however it is of course preferably in a tree path.

The comparator 22 for which this bit is INHIBIT=-FALSE and FINMON=TRUE writes onto the bus 36 its monomial number, while its FINMON bit is set to FALSE. This is a single comparator. The operation resumes at the next cycle. The first following TRUE monomial inhibits the monomials located to its right and broadcasts its identifier onto the bus. When the value of the INHIBIT bit at the output of the last comparator 22 received by the control module 26 reaches zero during the first phase of this cycle, the operation is complete and the operator 12 moves, to the "start of tuple" (DTUP) state.

The selected solution is an adaptation of the solution presented by [Anderson, G. A., "Multiple Match Resolvers: A New Design Method," IEEE Transactions on Computers (Correspondence), Dec. 1974 (ANDE74)]; 74]. This author proposes propagation of the inhibition bit in its current form along a tree structure. However, Anderson also calculates a physical address of the comparator whose result is at TRUE, using a simple circuit not presented herein. Indeed, in the database processor 12, the monomial identifier is a logical address of a group of comparators 22. The transmission of an identifier stored in the register, following the preceding algorithm, thus allows the transition from the predicate identifiers to the monomial identifiers. This allows for predicate operands of arbitrary length as well as multiple joins and sorting (with the same solution).

To transmit a monomial identifier to each monomial, a mechanism similar to the resolution module 14 may be employed. Because all of the predicates are set to 1 by a TRUE1 bit reserved for this phase, all of the FIN-MON end of monomials are at TRUE. The end of monomial comparators 22 are then activated in succession in the same manner as in the foregoing; the plus on the left (or the first one) inhibits the others, then cancels its FINMON value, and so forth. During this phase, whenever INHIBIT is FALSE and FINMON is TRUE, instead of writing onto the bus, a memory word from the input port is read from it. This word is the current monomial identifier. For a join, it is a tuple index, or for small numbers of S, it is a tuple address, but for other applications it may be a random value. This word is written onto its identifier register by the comparator 22 in FIG. 9. The iteration phase is completed when the INHIBIT bit of the last comparator reaches 0. This allows the comparator to be loaded independently of iteration, and consequently, for the assignment of an identifier without loading (for example, for testing). However, this method increases the cost of the sequencer 25 in FIG. 10. Another method for loading the identifiers, such as a memory word written onto the input port 30 of FIG. 9 after each end of monomial, may also be implemented; the advantage is that it executes this in one cycle per identifier instead of two, at the expense of less independence from monomial iteration; it results in a smaller number of internal products and states of the sequencer to be considered.

The assignment of identifiers to the monomials rather than to the predicates allows comparison of several attributes for each tuple of R to those of the current tuple of S; the operator may also be different depending on the attribute. For example, it is possible to verify the condition R.A1>S.A1 and R.A2=S.A2—for example, if R is a relation EMPLOYEE(NAME, SALARY, REGION) and S is an auxiliary relation S(MEAN_SALARY, REGION), the condition "employees whose salaries are higher than the regional mean" may be written as:

Retrieve R.NAME, R.REGION, R.SALARY, S.SALARY with S.MEAN_SALARY<R.SALARY and S.REGION=R.REGION. Because the relation S is smaller, its attribute values will be the operands of the qualification expression Q. The preceding condition will be expressed as an or of monomials in the form MEAN_SALARY<Att_2 and REGION=Att_3, where MEAN_SALARY and REGION are the values of these attributes in each of the tuples of S. A monomial identifier written on the bus will thus designate a tuple of S.

For this function, the processor 12 may be regarded as an associative memory structured in logic records of nearly arbitrary lengths, because there is one identifier per monomial and a predicate is divided into successive predicates. This represents a significant extension of associative memories, which have until now been structured in words of fixed length with no notion of attributes and records. Assume a qualification expression 11 of Q with and priority representing an or of the different attribute values of the relation R. Each attribute is represented by a predicate which may itself be viewed as a conjunctive monomial of a single term. If the operand of one of these predicates is too big to fit in the operand memory 19 of FIG. 20 (in principle, 32 bytes) this predicate will be divided into a then formed of several predicates, which will always form a single monomial. The identifier broadcast onto the bus during the result phase will be an identifier of the string of thens and therefore of the initial predicate, and not of one of the partial predicates obtained. This result remains true if the divided predicates are part of a same conjunctive monomial, since the thens may be processed either as a form of and or as a form of or.

In fact, the length of the logic record is limited by the monomial length. If the maximum length of a monomial that can be evaluated in one cycle is 15 to 40 predicates (60 to 200 ns cycle), the maximum length of the processor's logical record will be 480 to 1280 bytes. This is a very large size compared to the usual sizes of an attribute or even of a group of attributes used in a join. It is possible to allow monomials larger than this maximum if several cycles are used for the evaluation of each word written onto the input port or for query resolution-records of 2560 bytes to 5 megabytes/sec. At this time, the cycle time provided is 40 ns. The use of large records substantially corresponds to the projection operation, if the tuple is very large or comprises a large number of attributes; the projection is in fact processed as a modified auto-join, affecting all of the tuple attributes; the monomial therefore comprises at least the same number of predicates as there are attributes, unless detection of ends of attributes is inhibited in the control module.

Protection

One preferred embodiment of a projection operation using the resolution structure 10 according to the invention consists of the following:

the projected tuples are loaded sequential into the resolution structure 10, each in a logical group 16 of processors 22 associated to resolution modules 14 of the resolution structure 10, wherein each new tuple is loaded and compared concurrently with all of the previously loaded projected tuples by the comparison unit of each processor element 22 so as to eliminate the new tuple if it is already present in the resolution structure 10;

each new tuple is loaded in the logical group 16 of the corresponding processors 22, from a first processor (which is not idle) identified by a current loading flag placed at the end of the loading/comparison operation on the preceding tuple.

each qualification expression 11 to be evaluated is a disjunctive expression, each subexpression 11a or 11b of which represents the comparison of a fixed projected tuple of the relation on which the projection is performed, with a current projected tuple of the said relation, wherein each predicate (PRED) of the expression 11 to be evaluated is formed of the logical result (value of PRED) of a comparison performed by a processor 22 on a fixed attribute of a previously loaded tuple and a variable operand formed by an attribute of the said current tuple;

if the evaluation performed by the resolution structure 10 of the qualification expression 11 for the current tuple provides a result (FINAL VALUE)of TRUE, the current tuple has already been loaded and the said current loading flag remains in its current position;

if the evaluation of the current qualification expression 11 for the current tuple provides a result of FALSE, the current tuple has not yet been loaded, and the said current loading flag is relocated so as to load the said tuple and to identify the first processor 22 immediately following the last processor 22 of the logical group 16 for loading the said current tuple;

the array of retained tuples forms the final projected relation.

Two embodiments are possible for writing the result relation of the projection operation:

according to the first embodiment, it is possible to write in the result relation, the identifier or the value of each tuple for which the evaluation result of the qualification expression is FALSE before loading the next tuple;

in the second embodiment, the result tuples are written only once the entire relation is loaded.

Sorting (FIG. 7)

The object is not to obtain a series of sorted tuples, but a vector array returning for each tuple of index i the order ri of this tuple in the sort order. This information is sufficient for arranging the tuples in order through permutation of these tuple numbers, which may easily be deduced from the vector array. The sorted relation is obtained in one cycle from the permutation and the initial relation, and from a start of tuple address vector. This assumes that sorting is done internally, that is, in memory, as is always the case for physical sorters. If the relation to be sorted exceeds the size of the total memory of the database processor 12, an additional merge cycle is in principle required after internal sorting—or a distributive sorting cycle before internal sorting.

To compute the vector arrays, each tuple to be sorted is stored in one or more comparator element 22, the tuples stored in the processor 12 are then read in succession and broadcast on the internal bus 36 of the database processor 12. The duration of the operation is thus equal to that of two transfer cycles of the relation in the database processor 12, as in the case of an optimal physical sort algorithm, but here only one vector array is obtained. The tuple transferred at a given moment onto the internal bus 36 shall be called the current tuple. To determine the order of the current tuple in the relation, it is necessary:

a) to determine, for each tuple, whether it is superior (or inferior) to the current tuple;

b) to count the number of tuples which verify this condition.

For this purpose, the sort attribute values of the relation to be sorted are stored in the processor 12 as predicate operands and the sort attributes of the current tuple are written (in the order in which they appear) in the processor's input port 30 of FIG. 9. The predicate operator is "$<$" for sorting in ascending order, '$>$' for sorting in descending order.

We can now determine whether an attribute occurrence is greater than, equal to or less than another. We now want to determine this for a tuple, characterized by sort attributes in an arbitrary order. For example, given the tuple "abcd" to be compared to "a'b'c'd'," wherein each letter is an attribute; assume the sort attributes are 1, 2, 3 in that order. This tuple is greater than "a'b'c'd'" if (a$>$a' OR (a=a') and (b$>$b') OR (a=a') AND (b=b') AND (c$>$c'). This condition is also valid and b and (a' and b') are the two parts of an attribute A, which will not fit in the operand memory 19 of FIG. 21. The number of predicates to be evaluated for a tuple and the order of these elements relative to the tuple are arbitrary.

The first solution is to process the tuple array (or its sort attributes) as a single attribute, by inhibiting the end of attribute signals, thus evaluating a predicate whose operand does not fit in the local memory. A second option is to use a simple solution based on that adopted for monomial resolution.

Through this "sequential partitioning" technique, each comparator 22 receives the value "$<$" or "$=$" for attributes thus far considered on the INFIN and EQIN pins 146' or 146" of FIG. 7, each uses its own comparison result INF or EQ delivered respectively via inputs 144 and 144" of the resolution module 114 and, if appropriate, broadcasts the INFOUT, EQOUT bits onto the pins 150' and 150" connected to the following comparator 122 or FINMON delivered by a resolution module 114 at the output 152 used by the query evaluation tree. It is formed of parallel adders. INFOUT, EQOUT, FINMON are calculated according to the following rules:

$$INFOUTO = INFIN \text{ or } (EQIN \text{ and } INF)$$

$$EQOUT = (EQIN \text{ and } EQ) \text{ or } CONNECT$$

$$FINMON = INFOUTO \text{ and } CONNECT$$

$$INFOUT = INFOUTO \text{ and not } CONNECT$$

For purposes of uniformity in notation, we will use the term logical record, or, improperly, sort monomial, for all of the operands relating to one tuple. The sorting imperatives for the database operator mainly consist of evaluating the sort monomials and counting the number of monomials verified.

As in the case of a join, the length of the monomials that can be evaluated in one cycle per memory word is limited by the propagation times during sequential evaluation of the monomials. This evaluation uses two logic layers per comparator. Most of the usual tuples may thus be sorted in one cycle per word.

If the maximum size of a logical record that can be evaluated in one cycle per word is exceeded, it is possible to perform an evaluation in several cycles per word; however, the relations may also be divided into vertical "slices" and the vector array of the relation evaluated through the vector array of each tuple. This solution may also be used when the relation to be sorted does not fit in the operator but its number of tuples is less than the number of comparators 22. It is applicable both to the algorithm which uses one predicate per tuple and to the case wherein the database processor 12 comprises the resolution structure 10 for sorting.

A third solution is to follow the principle described below in the "overflow control" section.

Selection in Texts

The problems in selection in texts include prefix retrieval (sequences followed by a string of don't-care characters), suffix retrieval (sequences preceded by a string of don't-care characters), word retrieval, evaluation of texts with random characters belonging to a given class of characters, the selection of phrases or complete texts with notation of the selected elements; this latter problem is resolved by broadcasting at the end of each tuple, or of each element to be selected (phrase, etc.) verified monomial identifiers having as their value the weights of these monomials. Text evaluation is thus performed with a "join" bit (J) set to 1. All of these problems are easily resolved in the proposed architecture, wherein the problem requiring the most specific logic is the suffix retrieval described earlier.

PEs Control Logic

The processors 22 performing comparisons, the logical results of which constitute the predicates of the assertional expressions resolved by the structure of the invention, may be controlled by a processor's control logic.

This embodiment is particularly advantageous for managing overflow of comparisons onto several processors 22 and for controlling text selection with non-anchored sequences.

Overflow of a comparison operation onto several processors 22. (FIGS. 10, 21)

Transitions provide for controlling a predicate evaluated with several comparator modules. This occurs if the predicate operand exceeds the size of the local memory 19 as shown in FIG. 21, and requires the use of n such memories (n being a random number). The predicate is then represented as a series of n elementary predicates connected by the special then connector. Each elementary predicate is formed by applying the operator of the initial predicate to an operand fraction which fits in local memory 19. A then subexpression may be found in a monomial formed either of or or and connectors. For example, let 'Att_1>ABCDEF' as represented in FIG. 20B be evaluated with 2-character local memories 19. This predicate is transformed into the subexpression: 'Att_1>AB then Att_1>CD then At-t_1>EF'. The semantics of this expression and the corresponding transitions of the sequencer 25 of FIG. 10 shall be explained below.

Let 'abcdef be the content of attribute 1, wherein the last letters may have a null value. The subexpression corresponding to the initial predicate is, in conventional manner:

(ab>AB) or (ab=AB and cd>CD) or (ab=AB and cd=CD and ef>EF)

The predicates in the first column are evaluated by the first comparator 22 corresponding to the subexpression, those in the second column by the second, those in the third column by the third. In other words, and this is the only case, each of the first two comparators 22 evaluates one or two predicates, one with the operator of the initial predicate, the other with the '=' operator. If the result of the operation is equality, the comparator activates the next comparator 22 using the control bit CONT 27. In this instance, the predicate value (PRED) of this next comparator 22 which in some cases was at TRUE is reinitialized to FALSE. Two problems arise in the proper operation of this algorithm:

for the comparators which control the remainder of the operand and remained inactive, the result must be set to TRUE with AND priority, and to FALSE with OR priority. Thus, these comparators have no effect on the monomial value. This condition is obtained by individual transitions in the initialization phase of the automatic sequencer 25.

with AND priority and with a '>' operator (respectively '<') the result '=' for a comparator must be changed to a '>' result (respectively '<') or the PRED result bit set to TRUE; indeed, all the comparators must be at TRUE if the initial predicate is verified.

FIG. 21 illustrates an example of predicate evaluation on three consecutive comparators 22, with "and" priority (FIG. A) and "or" priority (FIG. 21B). The local memory 19 of each comparator or processor 22 is assumed to hold one character and the operation is a comparison of the attribute value 'ab' and the constant 'abc' through the operator '>.' The operation then consists of evaluating: att_i .>. a then att_i .>. b then att_i .>. c.

The numerals 0 and 1 associated to each comparator 22 during the three states (initial state, phase 1, phase 2) are the predicate values supplied to the resolution modules 14. The shaded areas correspond to the active comparators 22 for each state.

Control of comparison operations with don't-care character sequences

The non-anchored sequence or suffix evaluation is more complex. In fact, a logical group of comparators 22 is assigned to this evaluation. This group uses one of the specific communication channels between each comparator 22 and the next to propagate a data bit (ACTIGLI bit at the output of each comparator 22, SGLI at the input). When the database processor of FIG. 9 is initialized, each group of comparators 22 is formed by positioning a DGLI bit (start of non-anchored sequence) in the status register 23 of the first comparator 22 in the group, and a GLI bit (non-anchored sequence) in the next ones 22. It comprises as many comparators 22 as there are occurrences of the first memory word in the group. The first comparator 22 in the group only detects the occurrence of the first memory word. At each occurrence, it activates the first available comparator in the group. This comparator 22 then searches for an equality with the operand formed by the searched sequence, minus the first memory word. If this predicate is not found, the comparator 22 becomes available, otherwise the result is TRUE. The group of comparators 22 appears as a disjunctive submonomial (an or predicate) in a larger monomial, in case of priority of or. In case of and priority, it appears as a subexpression supplying as many monomial results as there are comparators 22 in the group; the or between the non-anchored sequence comparators 22 is thus formed of the expression resolution logic; however, the natural form for text retrieval is the or priority. If one of the comparators detects the sequence in a random position in the text, the result of the monomial or of the subexpression is TRUE, which is the desired condition. This non-anchored sequence may be combined by evaluation of a then connector and a thengli search with the next non-anchored sequence, if the definition: CONTI=FINMON and THEN and not FA, and SUITE=-CONT or CONT1; SUITE is an input bit in the sequencer of the following comparator. It is thus possible to have within a subexpression connected to the next one by an and, or non-anchored strings separated by thens. The following example illustrates these various possibilities:

Retrieve R.* with (Att_i="*ABCAB*" or Att_i="110") and (Att_i="*ABABBC*EFGEFG*"). As shown in FIG. G20A, the last term 17 ("*ABABBC*EFGEFG*") is broken down in the structure into (Att_j="*ABABBC" thengli Att_k='-"*EFGEFG"). For evaluating Att_j and Att_k, two additional subgroups 171a, 171b, 172a and 172b connected by an OR connector 15 are formed, wherein each of the subgroups 171a, 171b, 172a and 172b corresponds to recognition of one of the two possible memory words for start of sequence detection ("AB" or "uA," with "u" being random), assuming the words in this case are formed of 2 characters.

The term R.* represents all of the attributes of each selected tuple of R.

However, the evaluations of "thens" in non-anchored sequences assume that the monomials are evaluated in series with the predicates. In these evaluations, the logic cycle time of the comparator module 22, which is defined by the control module 26 (in FIG. 9), will thus be increased.

In the event the first character appears only once in the sequence, the comparator group is not used.

In the case of two-byte words to be stored in the memory 19, the non-anchored sequence may begin in the left byte or in the right byte. To resolve this problem, it must be treated as an "or" of two non-anchored sequences, one aligned to the left and the other not. Thus, the retrieval of "*ABABCDEF*" (FIG. 20B) will be processed like the retrieval of :AB:AB:CD:EF: or :uA:BA:BC:DE:Fu:, where "u" is the 'skip-floor' character (character equal to any character, including the other special characters) which takes the place of the word separators and the end of attribute characters. In this example, the boxes 19 represent the memory words and the secondary sequences ("ABCDED" and "BABCDEFu") overflow onto several processors.

Figure 19:
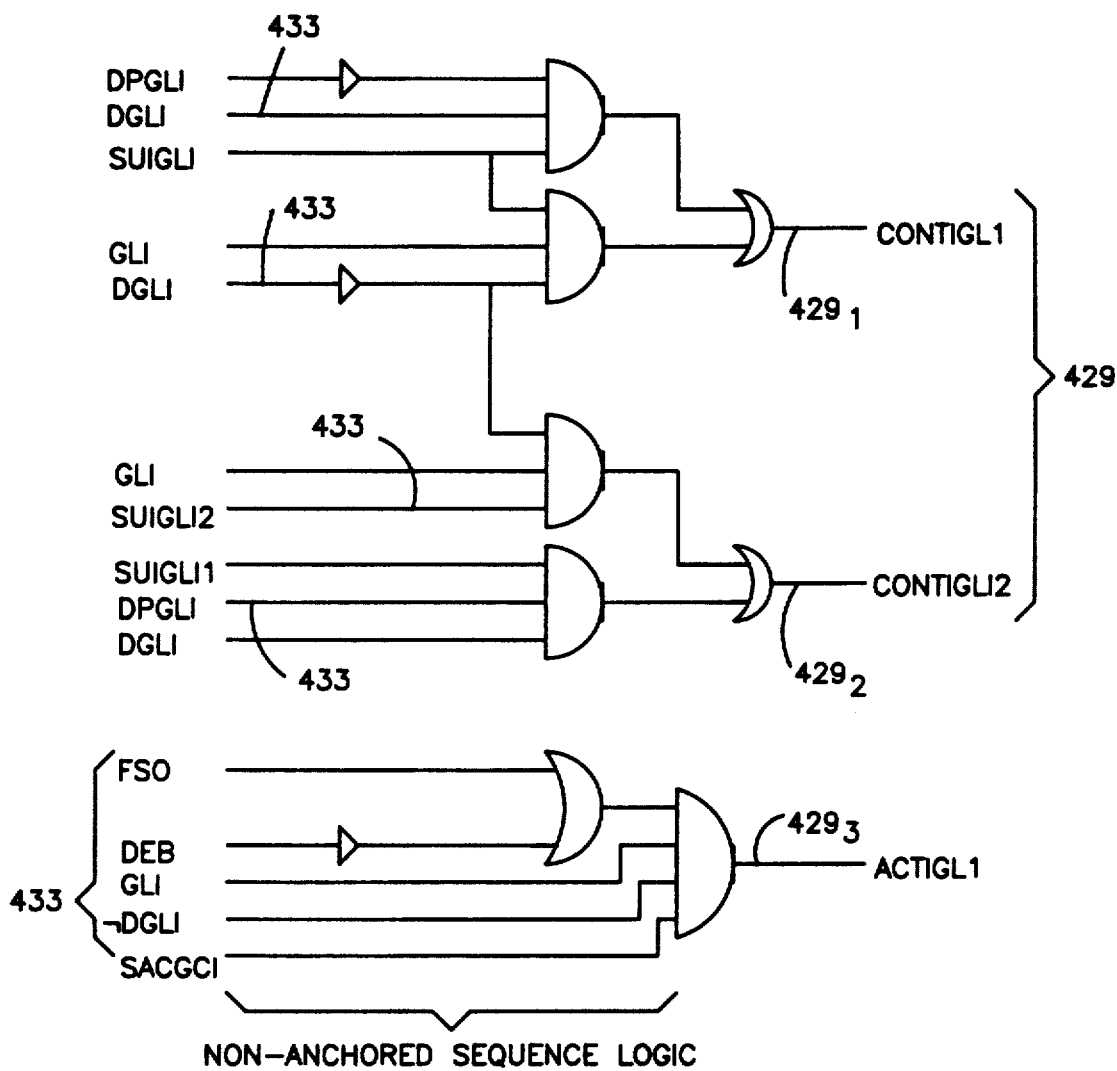
FIG. 19 is a schematic drawing of the interconnections between the processors associated to a Boolean expression resolution structure according to the invention, for the control of non-anchored comparisons, in assertional database consultation.

To process non-anchored sequences in a conjunctive subexpression, three specific processor interconnection paths 429 as shown in FIG. 18 and FIG. 19 are used. Each processor or comparator 22 (422) thus has three additional inputs and three additional outputs. The first two paths as seen in FIG. 19, called CONTIGLI1 and CONTIGLI2, correspond to processor inputs SUIGLI1 and SUIGLI2 and to outputs CONTIGLI1 and CONTIGLI2 (FIG. 18). The third will be called VPP, represented by the ACTIGLI track in FIG. 19, and corresponds to the SVPP input and the VPP output. In the simplified version of the extension to "and" of "or" of "and," VPB (SVPB/VPB) is a fourth additional path 343 in (FIG. 8).

Figure 20A:
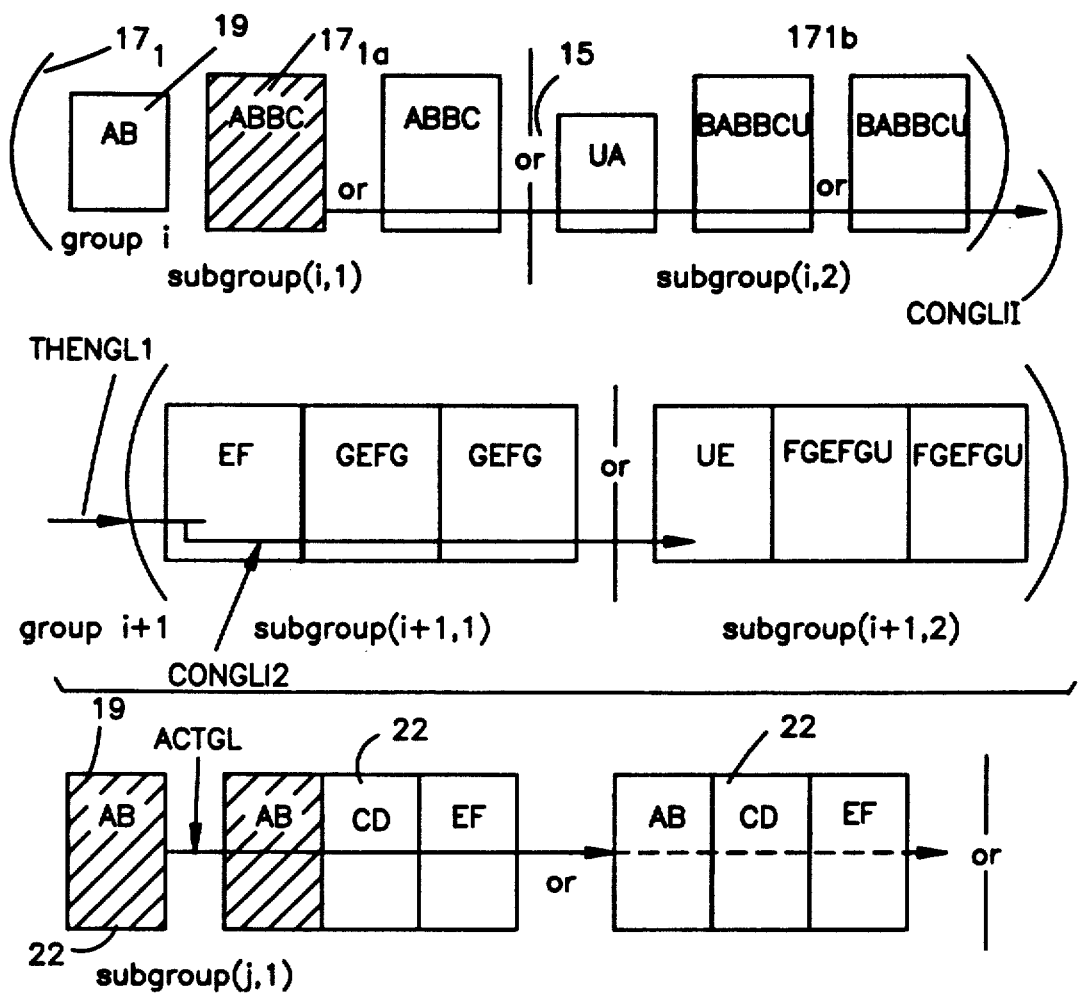
FIGS. 20A and 20B together illustrate respectively first and second logical groups of processor elements assigned to non-anchored sequence operations for Boolean qualification expressions intended for assertional database consultation.
Figure 20B:
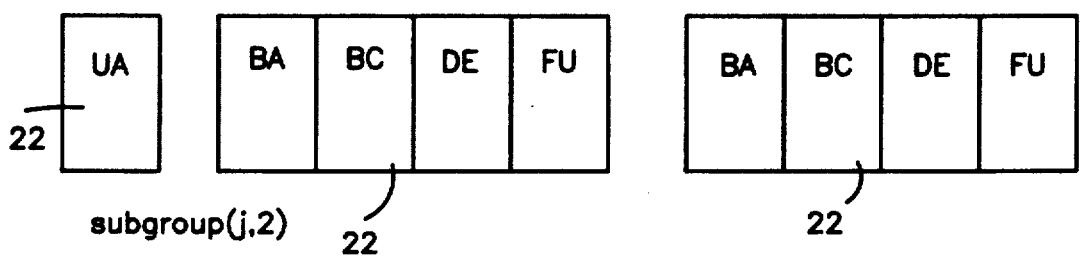

When evaluating a selection expression containing one or more non-anchored sequences, each sequence preceded by a non-anchored sequence is evaluated by a group $17_1$ of the comparators 22 in FIG. 20A, for which the status bits called connectors (CONNECT) are at "or" except possibly the last one. When the result "true" for this group of comparators 22 initiates evaluation of the field or document by one or several groups of the following comparators 22, the comparator 22 corresponding to the start of each group $17_1$ is activated not by the CONT/SUITE 443 or ACTIGLI/SGLI $429_3$ paths but by a different path 4291, CONTIGLI1. The existence of this path allows the enabling signal (CONTIGLI1) to be propagated to the first comparator 22 of the group following that which evaluated the non-anchored sequence, rather than propagating it only to the next comparator 22 or to the first available comparator 22 of the initial group $17_1$. The end of the first group $17_1$ or the start of the next group $17_2$ is signaled in the corresponding comparator 22 by a flag bit (not shown). These properties remain valid if the comparator 22 which initiates activation evaluates a predicate with or without a non-anchored sequence in an "or" of several predicates.

If it is not an ordinary sequence or a non-anchored sequence which is activated, but an "or" of predicates containing or not containing non-anchored sequences, the enabling signal is propagated at the beginning of these "ors" on a second additional path, CONTIGLI2 $429_2$. The signal is propagated in CONTIGLI2 up to the end of the "or." It activates each first comparator 22 participating in the evaluation of a predicate with a non-anchored sequence, or in the evaluation of an ordinary predicate of the "or" monomial This second path $429_2$ provides for evaluation of "ands" of "thens" of "or," otherwise it would only be possible to evaluate "ands" of "ors" of "thens." In practice, with two-byte words, a non-anchored sequence is always evaluated by an OR of two sequence retrievals, aligned to the right and to the left respectively, with THENGLI always using the two paths CONTGLI1 $429_1$ and CONTGLI2 $429_2$.

On the other hand, a further object of the invention is to provide for evaluation of predicates comprising a search in a field of the text type, in selection expressions with "and" priority. For this purpose, the use of an additional interconnection path VPP corresponding to ACTIGLI $429_3$ as shown in FIG. 19 allows for transmission to the last comparator 22 of a logical group of comparators for evaluating a non-anchored sequence (and to the associated monomial resolution logic) the current value of the "and" monomial before the start of the logical group under consideration. The monomial resolution logic of the last comparator 22 of this group then executes the "and" of this monomial value and of the result of the non-anchored sequence evaluation. In an exception to the "and" priority, the non-anchored sequence is processed like an "or" submonomial with "or" priority; the priority apparent to the query resolution tree remains the "and" priority.

The three interconnection paths CONTIGLI1 4921, CONTIGLI2 4292 and VPP 4293 used with an appropriate sequencing and signal switching logic 433 as shown in FIG. 18 on these paths, thus provide for complete resolution of the problem of non-anchored sequences in a sequence searched in a field of the text type, and of text retrieval with non-anchored sequences with priority of "and."

In the resolution module 14 of FIG. 9 with "and" priority, two situations may arise. First, the predicate may not be the last predicate of a non-anchored sequence. In this case, if it does not belong to a non-anchored sequence, the current monomial value for the resolution module 14 is an "and" of the predicate value (PRED) and of the preceding monomial value (MONOUT), supplied by the MONIN input 50 of FIG. 6, from the preceding "and" resolution module 14. The case wherein it is a non-final element of a non-anchored sequence does not change the circuit diagram. Second, the predicate may be the last predicate of a non-anchored sequence. In this case, the current monomial value is an "and" of the value of the "and" monomial preceding the non-anchored sequence carried on the SVPP path 4293 of FIG. 18, and of the value of the "or" submonomial formed by the preceding predicates of the non-anchored sequence and transmitted by the MONIN input 46 of the resolution module 14. The current monomial value thus obtained is the object of an "or" with the value obtained by the logical operation MONIN "AND" PRED in the other cases. It should be noted that the subexpression formed of the start of the "and" monomial and of the non-anchored sequence is processed like an "and" monomial; consequently, the ends of monomials selected by the circuit 12 as shown in FIG. 9 for the resolution modules 14 other than the last one in the monomial are indeed "TRUE" and form the neutral element of the "and" function.

It may be noted that the VPP path 4293 and the configuration of the resolution module 14 allow for processing "ors" of "and" of "or, wherein the results supplied by the resolution module 14 are then no longer monomial results of "and" of "or". In these expressions, retrievals of character strings with non-anchored sequences are predicates stored within an "and," as in the following example: (A and B and G1) or (C and G2 and G3), where A, B and C are usual predicates and G1, G2, G3 are text inclusion predicates, possibly containing a non-anchored sequence at the beginning of a term. It may also be desirable to retrieve "and" of "or" of "and", as in the following example: (A or G1 or G2) and (G3 or G4) and ((B and C) or (D and E)), with the same notations. In this example, the non-anchored sequences are alternating which may occur in the case of synonyms, and the expression (B and C) or (C and D) must apply in all cases, which cannot be easily expressed in the other form. The resolution modules 14 then supply a value of "or" of "and".

The description of the subexpression resolution structure for processing this case is presented below in the section entitled "Detailed Embodiment of the SPS."

APPLICATION NO. 2: ASSOCIATIVE MEMORY WITH VARIABLE LENGTH RECORDS (FIG. 12)

Figure 12:
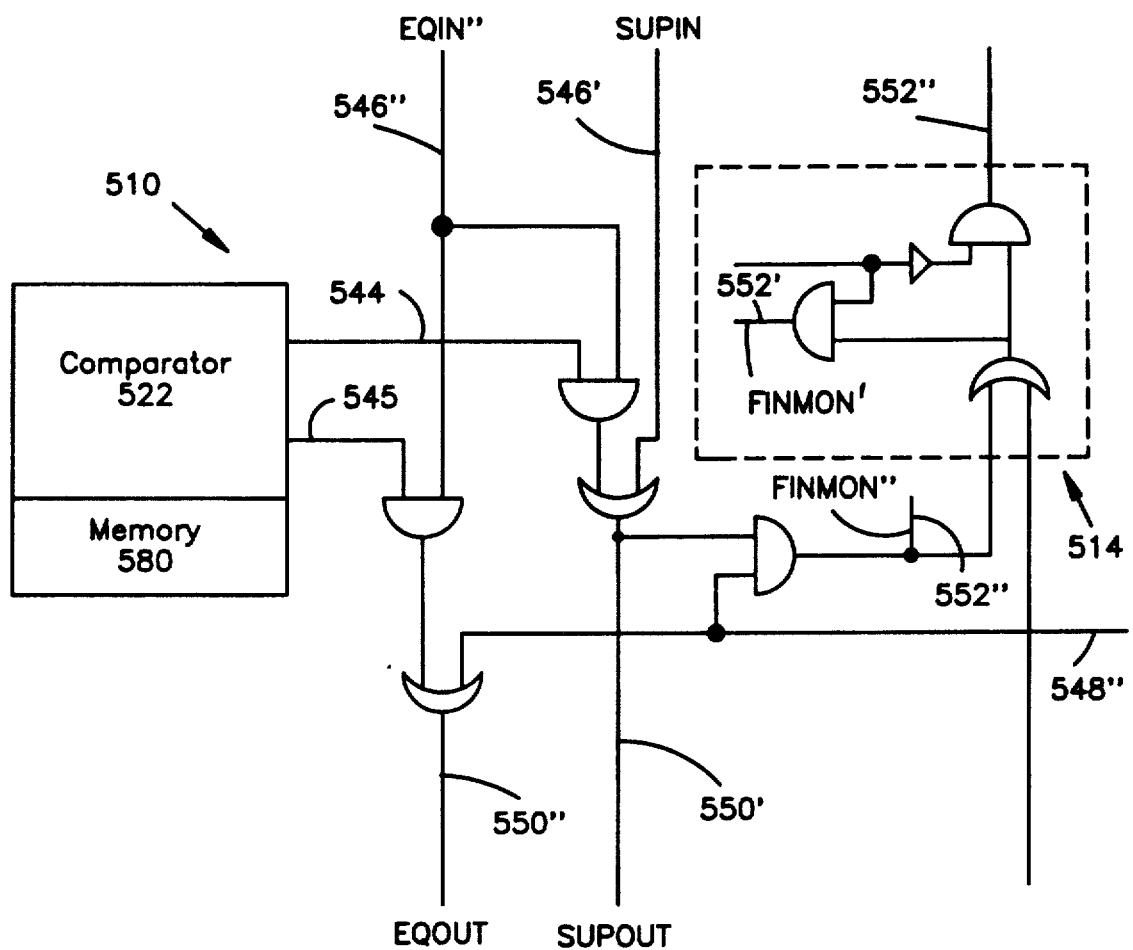
FIG. 12 illustrates the embodiment of the invention for implementing an associative memory with variable length records.

As an example of a sequential partitioned structure comprising several resolution modules 514 applied to a problem other than monomial resolution, an application to an associative memory 510 with variable length records shall now be described with respect to FIG. 12 where like elements are identified by like numbers but in the 500's series. This memory 510 is divided into words substantially formed by a comparator module 522. A record stored in memory 580 is distributed among several words thereof. When comparing a current record with records stored in memory, each word of each record is compared in succession to each word of the record and supplies a result of "<," ">" or "=".

This result is received at the input 544 or 545 of a sequential resolution module 514. However, the propagation of the result obtained sequentially is interrupted at the output of the module corresponding to the end of the record (end of logical group) and several sequential evaluations are thus conducted in parallel. The resolution logic 514 is divided into a sequential "=", the start of group input (EQIN) 546" is replaced by a "true" and a sequential ">", the start of group input (SUPIN) 546' of which is replaced by a "false." The result ">" is set to "false" outside the logical group endings, for use by a multiple match resolution logic. A simple mechanism for propagating the results to the start of the logical group provides the result "true" or "false" therefor RESUDEBGROUPE represented by FINMON' at the output line 552' as well as for the end of the group RESUFINGROUPE represented by FINMON" at the output line 552". This sequential partitioned circuit could be used to operate in simple fashion an associative shift memory, for insertion of a record in its place in an ascending or descending sort order, without first making binary comparisons on the records.

Resolution Module Failure Management

In the vector of associated resolution modules 14 and comparators 22 of FIG. 9, one or more Comparators 22 and modules 14 may malfunction.

The existence of an "idle" flag bit on these malfunctioning elements ensures their transparency in query resolution operations and causes these associated modules 14 and comparators 22 to output signals identical to those they receive at their inputs, from the preceding comparators 22 and modules 14.

Figure 17:
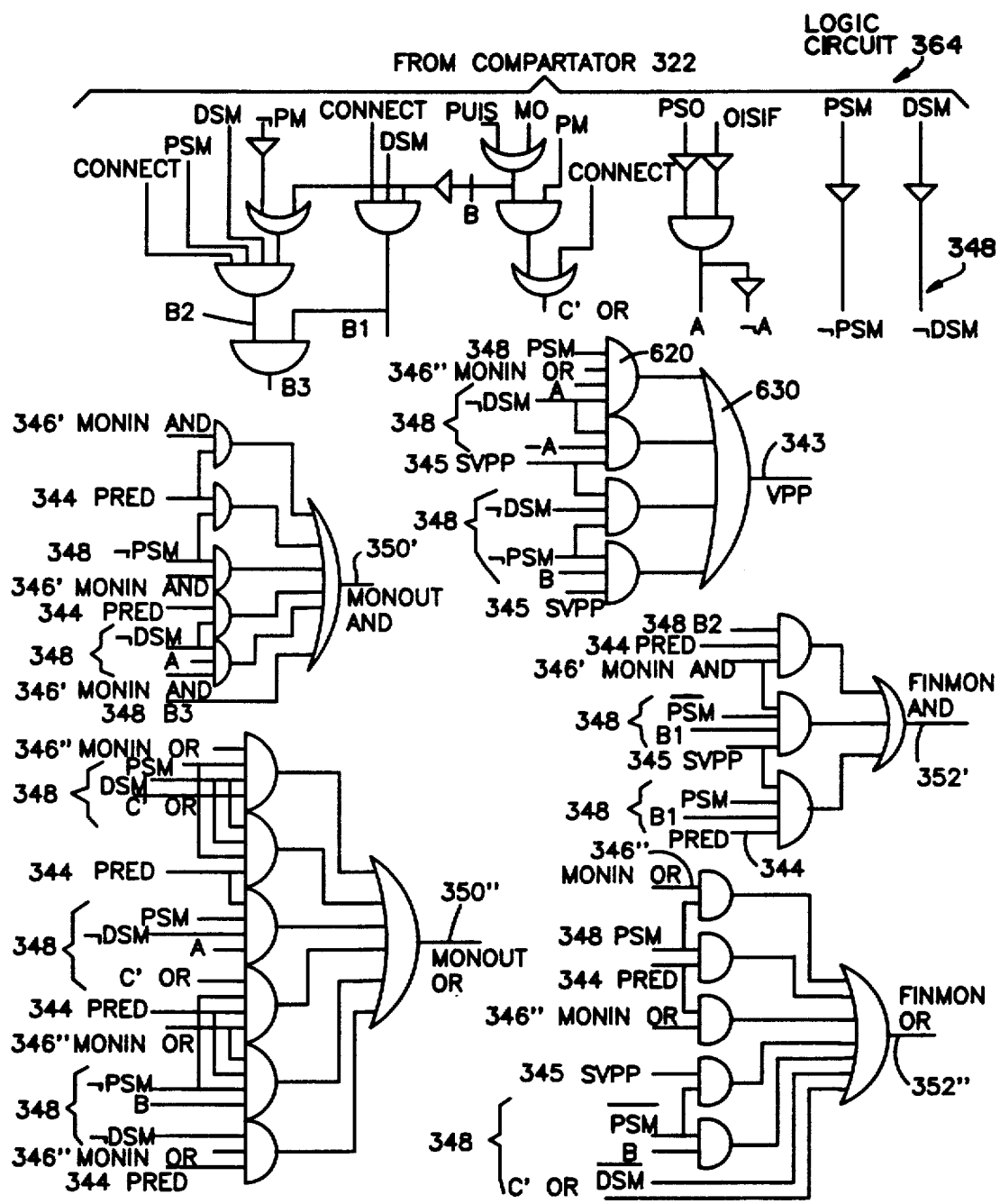

Detailed Embodiment of the Resolution Structure 10 ("Delayed" and "Non-delayed" Solutions) (FIGS. 14A, 14B and 16 for the Non-delayed Solution and FIGS. 15 and 17 for the Delayed Solution)

The circuits of FIGS. 16 and 17 comprise AND gates 620, OR gates 630 and NOT gates 610. In reality, NAND and NOT gates and inverters shall be used.

The calculus expressions of the subexpression resolution module 314 outputs (in the delayed version of FIG. 17) or of the resolution submodules 214', 214S' (non-delayed version of FIG. 16) are each illustrated by the associated equations. The notation used in the equations corresponds to the name of the inputs and outputs of the circuits in FIGS. 16 and 17. The value of the inputs and outputs is either "TRUE" or "FALSE" according to the equation.

A summary evaluation of the calculus time of a submonomial is also provided. In practice, specific evaluations performed with the aid of CAD tools have demonstrated that the evaluation time of a monomial or submonomial may actually be reduced to roughly 3 ns in the non-delayed version. This evaluation time is higher in the delayed mode, where, conversely, fewer gates are required.

TABLE 1

| QUERRY | PREDICATE Structure | Result | MONOMIAL/ SUBEXPRESSION Structure | Result | EXPRESSION Structure | Result | ADDITIONAL PROCESSING |
|---|---|---|---|---|---|---|---|
| Simple selection | $Att_i$ op. $cte_i = P_i$ -OR- $Att_i$ op. $Att_j = P_{ij}$ | True/False (T/F) | Priority (and/or) $M_j = P_{j1}$ AND $P_{j2}$ AND $P_{j3}$ $M_k = P_{k1}$ OR $P_{k2}$ OR $P_{k3}$ | T/F | No priority (and/or) $Q = M_1$ OR $M_2$ OR $M_j$ $A = M_1$ AND $M_2$ AND $M_k$ | T/F | If TRUE, the current tuple verifies the condition of selection |

TABLE 1-continued

| QUERRY | PREDICATE Structure | Result | MONOMIAL/ SUBEXPRESSION Structure | Result | EXPRESSION Structure | Result | ADDITIONAL PROCESSING |
|---|---|---|---|---|---|---|---|
| Join | $Att_r$ op $Att_s = P_i$ | T/F | $Mj = Pj_1$ AND $Pj_2$ | T/F | Q = Disjunctive expression | T/F | If TURE, (1) identification of verified monomials (MMR) (2) concatenation |
| Sorting | $Att_{jr}$ op $Att_{jr}$ op (<, or >) ascending descending sort) | T/F | (abc > a'b'c') = (a > a') OR (a = a').(b > b') OR(a = a').(b = b') (c > c') = $M_j$ | T/F | $Q = M_1$ OR $M_2$ OR $M_j$ | T/F | If TRUE, calculation adders of rank $r_i$ |

TABLE 2

EVALUATION CONNECTIONS

| QUERY | EVALUATION CONNECTIONS (RESULT EVALUATION) | | | SEQUENCING INTERCONNECTIONS |
|---|---|---|---|---|
| | Predicate | Submonomial | Monomial/Expression | |
| Prefix retreival | Simple selection | | Same as simple selection or join or other | Bit PREF; test 'FA', 'FO', '.=' |
| Suffix retreival disjunctive monomial (1-byte words) | Words (1 byte) evaluated sequentailly $P_i = Att_i$ op $cte_i$ | Disjunctive logical group (serially inserted in a monomial or disjunctive submonomial | Same as simple selection with priority of "OR" | Queue control path (CGF) with a submonomial |
| Suffix retreival in disjunctive monomial (n-byte words) | Words (in bytes) evaluated sequentially | n disjunctive logical subgroups whose n byte operands are relocated (ex: retreive: M = $SM_1$ OR $SM_2$ '*ABC' | Same as simple selection with priority of "OR" monomial | CONTIGLI 2 activates all the first PEs of logical groups within the disjunctive |
| | $P_i = Att_i$ op $cte_i$ | $SM_1$ = AttiopUA OR Att,op'BC' $SM_2$ = Att,op'AB' OR Att,op'CU) | | CGF within each submonomial |
| Retreive 2 success suffixes '*ABC*DEF' | Words evaluated sequentially | z disjunctive logical groups ... then ... $SM_1$ = '*ABC'puis $SM_2$ = '*DEF' (May be combined with preceding case if words of n bytes are evaluated in n.z logical groups) | Same as simple selection with "OR" priority | CONTIGLI 1 actives the first PE of the next logical group, when result for current grup is TRUE. CGF within each submonomial |

TABLE 3

EVALUATION CONNECTIONS

| QUERY | PREDICATES | SUBMONOMIALS (now anchored seq. each) | MONOMAIL | EXPRESSION | SUBSEQUENT PROCESSING | INTERCONNECTION |
|---|---|---|---|---|---|---|
| Suffix retreival in a conjunctive monomial (OR of AND of OR) | $P_i = Att_i$ op $cte_i$ | Disjunctive Submonomial SM = $P_i$ OR $P_j$ OR ... with result = SM AND SVPP on the last PE of the group, SVPP: value of the AND monomial preceding the non-anchored sequence | Conjuctive monomial | Disjunctive (OR of AND of OR) | | Already descrived |

TABLE 3-continued

| | | EVALUATION CONNECTIONS | | | | |
|---|---|---|---|---|---|---|
| QUERY | PRE-ICATES | SUBMONOMIALS (now anchored seq. each) | MONO-MAIL | EX-PRESSION | SUBSEQUENT PROCESSING | INTER-CONNECTION |
| Expression in AND of OR of AND example: (A or G$_1$ or G$_2$) and (G$_3$ or G$_4$) and (B and C) or (D and E)) | | 2 types of submonomials: *disjunctive submonomials of non anchored sequences G1, G2 (see above); *conjunctive monomials (B and C) = SM1 (D and E) = SM2. Results: SM'; OR SVPB on the last PE of the disjunctive submonomial. SVPB: current prev. value of the OR monomial | Disjunctive monomial | Conjunctive | | Already described + FGLI |
| Retrieval of character sequences in lists with parenthetical notations | | - Simple Selection - | | update of PROF (if | | Prof; TREE bits; TREE = 1) as a function of the occurence of the '('and')', Activation of the PEs when PROF is equal to a predetermined value |

REVIEW OF THE FUNCTIONS OF THE SIGNALS

Figure 1:
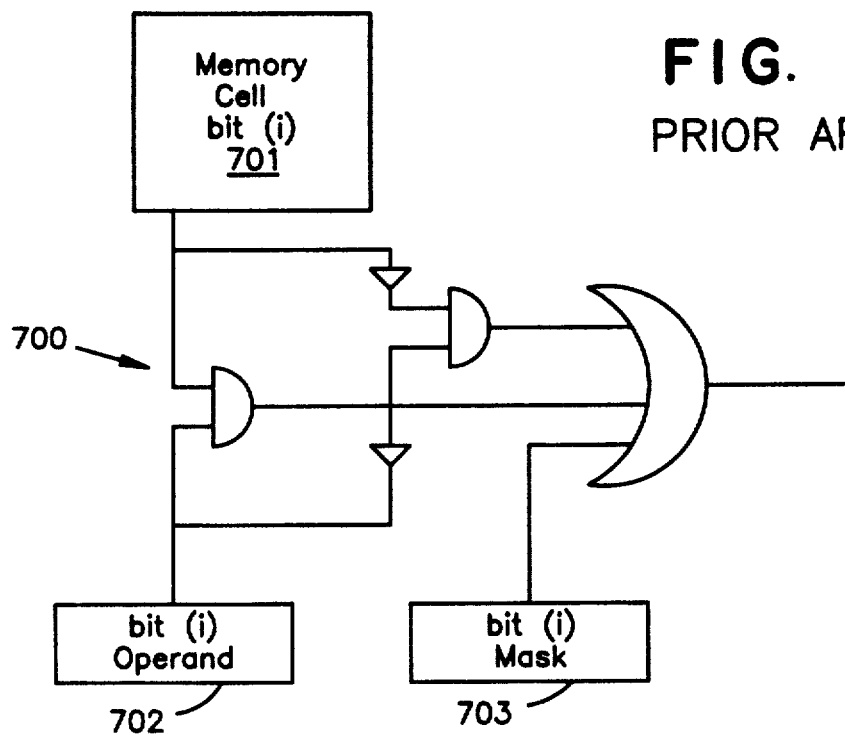
FIG. 1 is a logic diagram of a known architecture of an associative memory for equal comparisons.

This summary reviews the functions of the different inputs in calculating the monomials and submonomials. Monomials are defined as subexpressions 11a and 11b as shown in FIG. 1 with a parenthetical depth of level 2 and submonomials as subexpressions 11b1 and 11b2 of level 3, wherein the global expression 11 formed of an AND and an OR of monomials is of level 1. The number of different connection operators ("AND", "OR") used in a given level of these subexpressions is arbitrary, and the use of the term "monomial" has no significance in this respect. The priority of the expression is defined as the connector ("OR") used to connect the terms (predicates or submonomials) within level 2 subexpressions 11a or 11b. In other words, it corresponds to the usual definition of priority between Boolean operators, in an expression in normal form where level 2 subexpressions are monomials in the usual sense. The priority may therefore have the value AND or OR. Finally, subexpression resolution is performed by a vector of subexpression processing modules 314 (see FIGS. 8, 15 and 17 for "delayed" version), or possibly a monomial resolution module 214' (see FIGS. 14 and 16) associated to a submonomial resolution module 214S' (see FIGS. 14 and 16 for "non-delayed" version). In the non-delayed version, the term processing module 214 shall be used to designate the pair formed of a submonomial resolution module 214S" and a monomial resolution module 214'.

Each processing module 314 or 214 is supplied with a predicate value (PRED) supplied by a processing element 22 of FIG. 13 to an input 244 or 344. The other inputs are the value of the connector (CONNECT') 48 (in FIG. 9), the priority (PRIO) 62 (in FIG. 5), the preceding submonomial value 246S' or 246S" (SMIN, in the non-delayed version), the preceding monomial value 246', 246", 346' or 346" the inputs 248, 248S', 348 or 353 (see FIGS. 7 and 15) from t status register 23 (of FIG. 18) (STATUS) whose role is described below. In the non-delayed version, the submonomial resolution module 214S also transmits to the resolution module 214 a signal FSM 252S" or 252S' (end of submonomial value). The outputs of the processing module are SMOUT 250S' or 250S" (current submonomial value in non-delayed version), MONOUT 250', 250", 350" or 350' (current monomial value), FINMON 252', 252", 352' or 352" (end of monomial value). We shall now describe the role of the various inputs of the resolution module 214 or 314 shown in FIGS. 14 and 15 relatively to the inputs of FIGS. 14 to 17.

PSM and DSM (first and last submonomial predicate), which are represented as input values of the logic circuits 364 and 264 of FIGS. 16 and 17.

These provide for distinction of:

submonomials formed of a single predicate (PSM*DSM) equal 'TRUE" wherein * means AND logical function,—means (NOT) logical function, + means OR logical function.

ordinary predicates within a submonomial (—pSM-*—DSM) equal 'TRUE'.

the first predicate of a submonomial (PSM*—DSM) equal 'TRUE'.

the last predicate of a submonomial (—PSM*DSM) equal 'TRUE'.

which are governed by different inhibition rules which vary depending on whether the signal evaluated is FINMON 252 or 352, MONOUT 250 or 350, VPP 343, FSM 252S or SMOUT 250S. The first comparator 22 of the first predicate of a submonomial corresponds to a value of VPP equal to MONIN (in the "delayed" version) shown in FIGS. 8, 15 and 17. The last comparator 22 of the last predicate of a submonomial corresponds to a value of SMOUT equal to the neutral value for the operation performed in the submonomials, and a significant value of FSM (in the non-"delayed" version). The submonomials formed of a single predicate do not lead to calculating VPP. In the other cases, the value of SMOUT and MONOUT is significant, the value of FSM and FINMON is the neutral value of the operation which uses these values.

PUIS and MO, which are represented as input values of the logic circuits 264 and 364 as shown in FIGS. 16 and 17, indicate that the evaluation of the current predicate is continuing in the next comparator 22 (it may be said that the predicate is divided into elementary predicates connected by THEN connectors), or that it is reserved for continuing the evaluation (in the case of inter-attribute predicates of the type "Attribute_i op Attribute_j").

A comparator or processor 22 for which (PUIS+MO) is true is therefore not the last comparator in the predicate, which leads to inhibiting its FSM and FINMON value, and not inhibiting its MONOUT and SMOUT value.

FSO, which is represented as input value of the logic circuit 364 shown in FIG. 17, (operand fraction) characterizes the comparators 322 other than the first one in a group of comparators assigned to evaluate a same predicate. The start of the predicate operand is then stored in the first comparator 322 of the group, with the next ones serving as an overflow area for this predicate. The value FSO for a comparator 322 implies that it is not the first one in the predicate. When there is (FSO*—PUIS) the comparator 322 is the last of the predicate. The value of the outputs (neutral or non-neutral value) may vary depending on whether the comparator 322 is the last in a predicate or not, if the predicate is itself the last of a monomial or submonomial.

OISIF, which is represented as an input value of the logic circuit 364 in FIG. 17, (IDLE: comparator not in use) is used in inter-attribute comparisons of the type Attribute_i op Attribute_j. In these comparisons, comparators 322 are reserved for storing the operand. If the length of the current attribute requires a smaller number of comparators, the following comparators remain idle. The verification of a condition (OISIF*—MO) in a comparator implies that it is the last one of the predicate.

The comparison of PRIO and CONNECT (connector priority and modified connector value) generally allows determination of whether the comparator is the last of a monomial. The last comparator of a monomial is subject to different rules than the others, which results (MONOUT) in inhibition of some of its outputs 250 and 350 as shown in FIGS. 16 and 17 or on the contrary in delivery of a significant result (FINMON) on other outputs 252 and 352 as shown in FIG. G16,17.

PRIO (connector priority) allows determination of the neutral value which may constitute the value of FINMON, FSM, MONOUT or SMOUT. When these outputs supply significant results, this signal also allows determination of the connector (AND or OR) which applies either to MONIN and FSM to obtain the value of MONOUT or of FINMON, or to PRED and SMIN to compute SMOUT and FSM (in the non-delayed version).

In the delayed version, PRIO determines which connectors apply MONIN and PRED on the one hand to the result obtained and to SVPP on the other hand for calculating FINMON.

The following signals supply the values used in calculating the outputs of subexpression resolution modules, as a function of the conditions resulting from the preceding signals.

VPP is the input 343 shown in FIGS. 8 and 15 to a subexpression processing module 314 ("monomial resolution module") of a path which ensures that the monomial value is carried over at the start of the current submonomial, up to the last comparator 322 of that submonomial.

The input 343 of this path in the monomial resolution module 314 is called VPP 343, the output 345 is called SVPP. VPP is one of the arguments in the calculation of FINMON in the delayed version.

MONIN corresponding to inputs 246 and 346 (preceding value of the monomial) and PRED' corresponding to inputs 244 and 344 (current value of the predicate) are used in calculating MONOUT corresponding to outputs 250 and 350 (current value of the monomial) and FINMON corresponding to outputs 252 and 352 (end of monomial value) in the delayed version (see FIG. 15). FINMON has a non-significant value except at the end of the monomial, MONOUT has a non-significant value at the end of the monomial. These values are the neutral element of the operation which uses these results.

SMIN and PRED' corresponding to inputs 246S and 244 are used in the calculation of SMOUT corresponding to output 250S (current value of the submonomial) and of FSM corresponding to output 252S (end of monomial value) in the non-delayed version (see FIG. 14). SMOUT has a non-significant value in the processing module corresponding to the last comparator 222 of the last submonomial predicate. Within a submonomial, FSM has a significant value in all processing modules, except at the end of a submonomial. In the case of a submonomial with a single predicate, FSM is equal to the value of the predicate.

MONIN and FSM (end of monomial value) are used in calculating MONOUT and FINMON in the non-delayed version.

The PM, PRIO, PUIS, MO outputs, as shown in FIGS. 1 and 17, of the comparator 222 or 322 determine the comparators 222 or 322 belonging to the last predicate of a monomial, other than the last comparator. For these comparators, it is necessary to correct the value of the connector (CONNECT). This correction is due to the fact that the connector connecting one predicate (PRED) to the next is broadcast to all of the comparators 222 or 322 participating in the evaluation of this predicate. For the last predicate of a monomial, the connector value of all comparators other than the last one must be the value of the monomial connector, and not the value of the next monomial's connector. The same problem may arise at the submonomial level (in the non-delayed version); however, to simplify the circuits, another solution was selected in this case.

In evaluating C'-OR, C'-AND (corrected connector), PM indicates that the predicate belongs to a monomial having several predicates. In the reverse case, C'-OR, C'-AND is equal to CONNECT and no correction is made.

If the submonomial is the last in the monomial (DSM=TRUE), by comparing PRIO and CONNECT, it is possible determine if the predicate is the last of a monomial. In this case, if —(PUIS+MO), the current comparator 222 or 322 is the last in the monomial. C'-OR, C'-AND then receives the value of CONNECT for the preceding PEs in the monomial, which is a function of PRIO. Otherwise, C'-OR, C'-AND is equal to CONNECT. In practice, the DSM condition may be omitted because C'-OR, C'-AND is only used when this condition is verified. Equations of outputs according to inputs for a delayed version resolution module 314 are presented as shown in FIGS. 15 and 17.

In the following, "—" means NOT function; "+" means AND function; "+" means OR function.

A = FSO.−OISIF.
B = PUIS+MO.
B1 = DSM.−B.Connect.
B2 = PSM.DSM.CONNECT.(−PM+B).
B3 = B1+B2.
C'_OR = CONNECT+PM.B.
_precalculated in parallel with the evaluation.
VPP = PSM.−DSM.A.MONI+DSM−DSM−A.SVPP.+PSM.−DSM.SVPP+PSM.B.SVPP.
MONOUT_AND = B3+MONIN_AND.-PRED'+PSM.PRED'+DSM.PRED'+PSM.MONIN_AND DMS.A.MONIN₁₃ AND
MONOUT_OR = PSM.DSM.C'_OR-.MONIN_OR+PSM.DSM.C'_OR.-PRED'+PSM.−DSM.A.PRED'+PSM.C'_OR.-MONIN_OR.PRED'+PSM.B.MONIN_OR.-PRED'+DSM.MONIN_OR.PRED
FINMON_AND = B2.MONIN_AND.-PRED'+PSM.B1.SVPP-.MONIN_AND+PSM.B1,SVPP.PRED'
FINMON_OR = PSM.MONIN_OR+PSM.-PRED'+MONIN_OR.-PRED'+PSM.SVPP+PSM.B.+DSM+C'OR.

one 7 inputs gates, two 6 inputs gates, one 5 inputs gates. number of gates (in an AND/OR implementation): 39.

calculus duration of monomial: $Tm = N(pe) \times 2 \times Tp$
resolution duration for a query: $Tr = max[Tm1, \ldots Tmi, \ldots Tmn(m)]$ Tp_calculus duration for a PE.
N(pe)_number of PEs in a submonomial.
N(sm)_number of submonomials in a monomial.
N(m)_number of monomials in a query
PSM: first predicate in a submonomial (or subexpression)
DSM: last predicate in a submonomial
PM: monomial predicate (belongs to a monomial or a submonomial)
IDLE: idle PE in a PEs group evaluating an inter-attribute predicate (Att_i op ATT_j)
MO: multi-operand. One of the n−1 first PEs in a group of n PEs evaluating an inter-attribute predicate
PUIS: (THEN) the predicate operand continues in the next PE
FSO: the PE contains a fraction of an operand, following that of the previous PE
CONNECT: connector between predicates: initial value
CONNECT': connector between predicates: calculated value
PRED': predicate value calculated by the PE automation
VPP: current value of the monomial
SVPP: current value of the monomial in the last PE before the current submonomial
MONIN: current monomial value, transmitted by the previous PE; neutral value (versus the monomial connector) in the first PE of the monomial
MONOUT: current monomial value, transmitted to the next PE
FINMON: monomial value, significant in the last PE of the monomial (otherwise the neutral value for the operation which uses FINMON)

and priority: PRIO = 1 (TRUE); or priority: PRIO = 0
and connector: CONNECT = 0; or connector: CONNECT = 1

The outputs PSM, DSM PRIO, PUI, MO from the comparator 322 of FIG. 16 are used to determine the inhibit conditions for the SMOUT output 250S as shown in FIG. 16 and to select the connector applied to SMIN and PRED' inputs of submonomial resolution modules 214S' and 214S" to form SMOUT if there is no inhibition.

The SMOUT outputs 250S' and S' assume the values of the neutral elements of the operation performed by the submonomial resolution modules 214S' and 214S" (that is, of the level 3 subexpression $11b_1$, $11b_2$), wherein the global expression is at level 1) in the last comparator 22 of the last predicate of the submonomial.

This case corresponds to the conditions DSM* PUIS* MO. DSM indicates that it is the last submonomial predicate, PUIS is in the TRUE position when the operand of the current predicate continues in the comparator 222 (overflow of the capacity of the current comparator 222 by the predicate operand). MO is set to TRUE when the next comparator 222 is reserved for an inter-attribute comparison sequence. In both cases, the current comparator 222 is not the last comparator 222 in the submonomial.

SMIN and PRED', which are applied to the inputs 246S', 246S" and 244S' of submonomial resolution module 214S as shown in FIG. 14B, are, respectively, the preceding value of the level 3 submonomial, and the predicate value (PRED) supplied by the comparator 222 (value of the current level 3 term). When the connector within the monomials is an "and" (priority PRIO = TRUE), the connector applied to the submonomial terms is an "or" and, conversely, it is an "and" in case of priority of "or."

The PSM, DSM, PUIS, MO, PRIO outputs from the comparator 222 of FIG. 16 determine whether the current comparator 222 is the last in a submonomial (end of level 3 subexpression, wherein the global expression is at level 1) in which case FSM assumes the submonomial value; or, if the current comparator 222 is not at the end of a submonomial, FSM assumes the value of the neutral element of the operation which uses FSM; this operation is a logical "or" when the connector within the monomials (or level 2 subexpressions) is an "and" and the logical "and" in the reverse case.

The conditions wherein inhibition occurs are represented by —PSM* (DSM*(PUIS+MO) DSM)). In the case of PUIS or MO, the evaluation of the current predicate continues to the next comparator 222, the comparator 222 is therefore not the last in the submonomial, and there is inhibition. In the case of DSM, the predicate is not the last predicate of the submonomial and inhibition also occurs. In the case of a submonomial having a single element (PSM*DSM), the FSM outputs of the (n−1) comparators 222 of the predicate which do not determine the result are inhibited, assuming the predicate is evaluated by n comparators 222. This inhibition occurs at the comparator level, according to the same logic as for controlling the THENs (see description of "overflow" operations. Indeed, it may not be done independently of the results, which may carry a significant value for any one of the n comparators.

If there is no inhibition, the selection of the connector applied to SMIN and PRED' is dependent only on the priority of the monomial, which determines the connectors between the submonomial terms.

The outputs PSM, DSM, PRIO and CONNECT from the comparator 222 as shown in FIGS. 16 and 14 are used to determine the inhibition conditions of the MONOUT outputs 250 and the selection of the MONIN 246 and FSM 244 inputs in the case wherein MONOUT is not inhibited.

MONOUT assumes the value of the neutral element for the connector connecting the monomials ("and" with priority of "or" and vice-versa) when the current comparators 222 is the last comparator 222 in the monomial. This condition implies that the comparator 222 is the last of the submonomial in submonomials of several predicates, and that this submonomial is the last one in the predicate. The corresponding inhibition condition is DSM *(PRIO@, with PRIO@CONNECT'=(PRIO*-CONNECT'+ −PRIO*−CONNECT'). One implicit case wherein the comparator 222 is not the last of the monomial is the case of (PUIS+MO), in this case the comparator 222 is not the last in the predicate. However, this possibility is indirectly controlled by the calculation circuit of CONNECT'(C'-OR, C'-AND). As shown in the corresponding FIG. 16, the value of CONNECT with priority of "and" (C'-and) is equal to the CONNECT connector of the predicate only if neither PUIS nor MO are verified. In this way, the "or" connector which separates two successive monomials with priority of "and" is present only in the last comparator 222 of the monomial. With priority of "or," the connector separating two monomials is an "and." A symmetrical mechanism guarantees that the "and" is present only in the last predicate of a monomial with "or" priority. PUIS and MO therefore do not appear in the calculus expression of MONOUT.

When there is no inhibition, MONOUT is obtained by applying the "and" or "or" connector to MONIN and FSM. The choice of one of these connectors is dependent only on the monomial priority. In case of "and" priority, the "and" connector is applied, in case of "or" priority, the "or" connector is applied.

The outputs PSM, DSM, PUIS, C'-OR, C'-AND, C'-OR, from the comparator 222, and logic circuit 264 as shown in FIG. 16, are used to determine under which conditions the end of monomial value FINMON receives as a value the neutral element of the operation which uses FINMON, and what is the "and" or "or" logic function of MONIN and FSM which FINMON delivers as a result in the other cases.

FINMON delivers a neutral value in all of the cases where MONOUT delivers a significant value, and vice-versa. The logic conditions corresponding to the last comparator 222 of a monomial, or each of the other possibilities, are the same as with MONOUT, with only the value of the result associated to these different cases varying. With priority of "and," the operation performed on monomial values is the logical "or," the corresponding neutral element (inhibition value of FINMON) is FALSE, with a priority of "or," the neutral element for the operation which uses FINMON is TRUE.

Equations of outputs according to inputs for a non-delayed version resolution module 214 are presented below in respect with FIGS. 14 and 16.

In the following, "" means NOT function, "." means AND function, and " + " means OR function.

A = PUIS+MO
C'_and=( PM+A).CONNECT
C'_or=CONNECT+PM.A
B=PSM.A+DSM
_precalculated in parallel with the evaluation
SMOUT_and=B.(SMIN_AND+PRED')
SMOUT_or=PSM.DSM+DSM.+A+S-MIN_or.PRED'
FSM_and=PRED'+PSM.SMIN_AND+B
FSM_or=PSM.DSM.PRED'+DSM.—A.S-MIN_or.PRED'
MONOUT_and=DSM.C'_and-+MONIN_or.FSM
MONOUT_or=(C_or+DSM).-(MONIN_AND+FSM0
FINMON_and=DSM  .C'_and-.MONIN_AND.FSM
FINMON_or=MONIN_OR+FSM+-C'_or+DSM number of gates in AND/OR implementation: 26
calculus duration of a monomial:
$Tm = N(pe) \times 2 \times Tp + N(sm) \times 2 \times Tp$
resolution delay of a query: $Tr = \max[Tm1, \ldots Tmi, \ldots Tmn(m)]$
Tp_calculus time for one PE (processor)
N(pe)_number of PEs in a monomial
N(sm)_number of submonomials in a monomial:
N(m)_number of monomials in a query:
PSM: first predicate in a submonomial (or subexpression)
DSM: last predicate in a submonomial
PM: monomial predicate (belongs to a monomial or a submonomial)
MO: multi-operand. One of the n−1 first PEs (processors) in a group of n PEs evaluating an inter-attribute predicate
PUIS: (THEN) the predicate operand continues in the next PE
FSO: the PE contains a fraction of an operand, following that of the previous PE (processor)
CONNECT: connector between predicates;: initial value
CONNECT': connector between predicates: calculated value
PRED': predicate value calculated by the PE automation
SMIN: current value of the submonomial, transmitted by the previous
SMOUT: current value of the submonomial, output by the current PE (processor)
FSM: submonomial value, significant in the last PE (processor) of the submonomial (otherwise the neutral value for the operation which uses FSM)
MONIN: current monomial value, transmitted by the previous PE (processor); neutral value (versus the monomial connector) in the first PE of the monomial
MONOUT: current monomial value, transmitted to the next PE (processor)
FINMON: monomial value, significant in the last PE (processor) of the monomial (otherwise the neutral value for the operation which uses FINMON)
and priority: PRIO=1 (TRUE); or priority: PRIO=0
and connector: CONNECT=0; or connector: CONNECT=1

We claim:

1. Apparatus for repetitively performing a comparison operation in accordance with a predicate operator code (comprising equal to, greater than, or less than) on at least one data word with respect to an operand word to provide values of comparison predicates (comprising true or false) and then evaluating an expression comprising a plurality of said comparison predicates connected logically by at least one expression operator, said apparatus comprising:

a) a plurality of N comparator modules, each comparator module corresponding to one of said comparison predicates and comprising an input for receiving said data word to be processed, and comparator means for comparing in accordance with said predicate operator code said data word with said operand word and for generating in accordance with said comparison a value of its corresponding comparison predicate at an output, said respective inputs of said plurality of N comparator modules being arranged to receive said data word in parallel with respect to each other, said respective outputs of said plurality of N comparator modules being arranged to output said respective values of said comparison predicates in parallel with each other;

b) a plurality of N resolution modules disposed in a n ordered chain defined by said expression, said expression comprised of a plurality subexpressions, each comprised of at least one of said comparison predicates, each resolution module corresponding one of said comparison predicates and adapted to perform at least one given logical function determined by said expression operator associated with its comparison predicate on the corresponding value of its comparison predicate; and c) a plurality of logical groups of said resolution modules, each logical group including at least one resolution module, and related to a corresponding one of said subexpressions;

d) each resolution module comprising a first input coupled to said output of its corresponding comparator module for receiving a value of its comparison predicate, said respective first inputs of said plurality of N resolution modules being arranged in parallel with respect to each other, a first output, a second input adapted to be coupled to said first output of a previous resolution module in said ordered chain, logic means for operating in accordance with its given function on its value of said comparison predicate and said first output of said previous resolution module to provide at its first output a current subexpression value, a third input for receiving a position information signal indicative of the position of said corresponding comparison predicate within said subexpression, and a second output for selectively providing a final value of said subexpression dependent upon said position information signal, said value and said first output of said previous resolution module, said respective second outputs of said plurality of N resolution modules being arranged in parallel with respect to each other;

e) said position information signal determining which of said resolution modules within a logical group is its last resolution module, said last resolution module applying at its first output a non-significant signal with respect to said next resolution module of said adjacent logical group of resolution modules.

2. The evaluating apparatus as claimed in claim 1, wherein each of said subexpressions is connected logically to another subexpression by a selected expression operator, and there if further included final query resolution means connected to each of said second outputs of said plurality of resolution modules for operating on said final values of each of said subexpressions in accordance with said selected expression operator to provide at its output a final value of said expression.

3. The evaluating apparatus as claimed in claim 1, wherein at least one of said plurality of logical groups includes at least first and second resolution modules, said logic means of both of said first and second resolution modules being responsive to their input values, said first outputs of said previous resolution modules in said ordered chain and said position information signals respectively so that only one of said logic means of said first and second resolution modules provides at its second output a final subexpression value of said one logical group.

4. The evaluating apparatus as claimed in claim 1, wherein said logic means of at least one resolution module of said plurality is capable of performing at least first and second functions on its input value, said one resolution module having a fourth input for receiving a function selection signal, whereby said logic means performs a corresponding selected function on said value of its comparison predicate.

5. The evaluation apparatus as claimed in claim 1, wherein said expression includes a first subexpression of a second level, said first subexpression includes a second subexpression nested therein of a third, lower level, said plurality of resolution modules including a first set of resolution modules dedicated to operate on said first subexpression of said second level, and a second set of resolution modules nested in said first set of resolution modules and dedicated to operate on said second subexpression of said third level.

6. The evaluating apparatus as claimed in claim 1, wherein each of said logic means comprises first means responsive to said position information signal for inhibiting said final value of said subexpression from being applied at said second output, second means responsive to said position signal for inhibiting said current subexpression value from being applied at said first output, and final query resolution means connected to each of said second outputs of said plurality of resolution modules for operating on each of said final values as provided by said corresponding uninhibited first means to provide a final value of said expression.

7. Apparatus for repetitively performing a comparison operation in accordance with a predicate operator code (comprising equal to, greater than, or less than) on at least one data word with respect to an operand word to provide values of comparison predicates (comprising true or false) and then evaluating an expression comprised of at least first and second subexpressions connected logically by a first expression operator of a first level, each subexpression including at least one comparison predicate, said first subexpression is a monomial comprising a plurality of said comparison predicates connected logically by at least one second expression operator of a second level lower than said first level, said apparatus comprising:

a) a plurality of N comparator modules, each comparator module corresponding to one of said comparison predicates and comprising an input for receiving at least one data word to be processed, and comparator means for comparing in accordance with said predicate operator code said data word with said operand word and for generating in accordance with said comparison a value of said comparison predicate at an output, said respective inputs of said plurality of N comparator modules being arranged to receive said data word in parallel with respect to each other, said respective outputs of said plurality of N comparator modules being arranged to output said respective values in parallel with each other;

b) a plurality of N resolution modules, each resolution module corresponding to one of said comparison predicates and adapted to perform at least first and second different logical functions on the corresponding value of its comparison predicate, each of said logical functions being determined by said expression operator associated with its comparison predicate, said plurality of N resolution modules serially connected in an ordered chain defined by said expression;

c) a plurality of logical groups of said resolution modules, each logical group including at least one resolution module and related to a corresponding one of said first and second subexpressions; and d) each resolution module comprising first and second submodules, each of said first and second submodules comprising a first input coupled to said output of its corresponding comparator module for receiving a value of its comparison predicate, said respective first inputs of said plurality of N resolution modules being arranged in parallel with respect to each other, a second serial input, a first serial output, said second serial inputs of said first and second submodules of one resolution module being coupled respectively to said first serial outputs of said first and second submodules of a previous one resolution module in said ordered chain, logic means for operating in accordance with a corresponding one of said first and second functions on said value of its comparison predicate and said first serial output of said previous resolution module to provide at its first serial output a current subexpression value, a third input for receiving a signal indicative of the position of said corresponding comparison predicate within said subexpression, and a second output for selectively providing a final value of said subexpression dependent upon said position information signal, said value and said first serial output of the corresponding one of said first and second submodules of said one previous resolution module, said respective second outputs of said plurality of N resolution modules being arranged in parallel with respect to each other;

e) said position signal determining which of said resolution modules within a logical group is its last resolution module, said first and second submodules of said last resolution module applying at each of their first serial outputs a non-significant signal with respect to said next resolution module of said adjacent logical group of resolution modules.

8. The evaluating apparatus as claimed in claim 7, wherein there is further included selecting means for each resolution module comprising first and second inputs connected respectively to said second parallel outputs of said first and second submodules, a third input for receiving a selection signal, and a fourth output for providing a value of said subexpression selected in accordance with said selection signal.

9. The evaluating apparatus as claimed in claim 8, wherein there is further included first and second final query resolution means, each comprised of an output and a plurality of logic elements connected in a tree-structure and of a type corresponding respectively to said first and second functions, said first and second final query resolution means connected respectively to said second parallel output of each of said first and second submodules of said resolution modules for operating on said final value of each of said subexpressions to provided at their respective outputs a final value of said expression.

10. The evaluating apparatus as claimed in claim 9, wherein there is further included selecting means including first and second inputs connected respectively to said output of said first and second final query resolution means, a third input for receiving a selection signal, and a fourth output for providing a final value of said expression selected in accordance with said selection signal.

11. Apparatus for repetitively performing a comparison operation in accordance with a predicate operator code (comprising equal to, greater than, or less than) on at least one data word with respect to an operand word to provide values of comparison predicates (comprising true or false) and then evaluating an expression comprising a plurality of said comparison predicates connected logically by at least one expression operator, said apparatus comprising:

a) a plurality of N comparator modules, each comparator module corresponding to one of said comparison predicates and comprising an input for receiving said data word to be processed, and, comparator means for comparing in accordance with said predicate operator code said data word with said operand word and for generating in accordance with said comparison a value of said comparison predicate at an output, said respective inputs of said plurality of N comparator modules being arranged to receive said data word in parallel with respect to each other, said respective outputs of said plurality of N comparator modules being arranged to output said respective values of said comparison predicates in parallel with each other;

b) a plurality of N resolution modules interconnected serially in an ordered chain defined by said expression, said expression comprised of a plurality of subexpressions, each comprised of at least one of said comparison predicates, each resolution module corresponding to one of said comparison predicates and adapted to perform at least one given logical function determined by said expression operator associated with its comparison predicate on the corresponding value of its comparison predicate; and c) a plurality of logical groups of said resolution modules, each logical group including at least one resolution module and related to a corresponding one of said subexpressions;

d) each resolution module comprising a first input coupled to said output of its corresponding comparator module for receiving a value of its comparison predicate, said respective first inputs of said plurality of N resolution modules being arranged in parallel with respect to each other, a first serial output, a second serial input coupled to said first serial output of a previous resolution module in said ordered chain, logic means for operating in accordance with its given function on said value of its comparison predicate and said first serial output of said previous resolution module to provide a current subexpression value, and a second output, resolution respective second outputs of said plurality of N resolution modules being arranged in parallel with respect to each other, first means coupled to said logic means and responsive to a position signal indicative of which of said resolution modules within a logical group is its last resolution module for applying said current subexpression value to its second parallel output as a final value of said subexpression, and second means connected to said logic means and responsive to said position signal for inhibiting the application of said current subexpression value to said first serial output and to said next resolution module of said adjacent logical group of resolution modules.

12. The evaluating apparatus as claimed in claim 11, wherein there is further included final query resolution means connected to each of said second parallel outputs of said plurality of resolution modules for operating on said final value of each of said subexpressions to provide a final value of said expression.

13. The evaluating apparatus as claimed in claim 11, wherein said logic means and said first means are comprised of one of an OR and AND circuits, and said second means is comprised of another said AND or OR circuits.

14. Apparatus for repetitively performing a comparison operation in accordance with a predicate operator code (comprising equal to, greater than, or less) on at least one date word with respect to an operand word to provide values of comparison predicates (comprising true or false) and then evaluating an expression comprised of at least first and second subexpressions connected logically by at least one first expression operator of a first level, said first subexpression comprised of third and fourth subsubexpressions connected logically by at least one second expression operator of a second level lower than said first level, said third subsubexpression comprised of fifth and sixth subsubexpressions connected logically by at least one third expression operator of a third level lower than said second level, said first and third expression operators being of the same type and opposite to that of said second expression operator, each of said subexpressions, subsubexpressions and subsubsubexpressions including at least one comparison predicate, said apparatus comprising:
   a) a plurality of N comparator modules, each comparator module corresponding to one of said comparison predicates and comprising an input for receiving said data word to be processed, comparator means for comparing in accordance with said predicate operator code said data word with said operand word and for generating in accordance with said comparison a value of said comparison predicate at an output, said respective inputs of said plurality of N comparator modules being arranged to receive said data word in parallel with respect to each other, said respective outputs of said plurality of N comparator modules being arranged to output said respective values of said comparison predicates in parallel with each other;
   b) a plurality of N resolution modules interconnected serially in an ordered chain defined by said expression, each resolution module corresponding to one of said comparison predicates and to a subexpression including said one comparison predicate, each of said resolution modules comprising first and second submodules, said first and second submodules dedicated respectively to performing first and second logical functions determined by corresponding ones of said expression operators associated with its subexpression on the value of the comparison predicate of its corresponding subexpression, each of said submodules including a first serial output and a second output, said respective second outputs of said submodules being arranged in parallel with respect to each other; and
   c) a plurality of logical groups of said resolution modules, each logical group including at least one resolution module and related to a corresponding one of said subexpressions;
   d) each submodule comprising:
   (1) a first chaining element including a first input for receiving a value of its corresponding subexpression, said first inputs of said first chaining elements being arranged in parallel with respect to each other, an output, a second serial input for receiving a first serial output from a first submodule of a previous resolution module in said ordered chain, and first logic means for operating in accordance with said first function on said value of the comparison predicate of its corresponding subexpression and said first serial output of said first submodule of said previous resolution module to provide at its output a first current value of said corresponding subexpression;
   (2) a second chaining element including a first input for receiving said value of the comparison predicate of its corresponding subexpression, said respective first inputs of said second chaining elements being arranged in parallel with respect to each other, an output, a second serial input for receiving a first serial output from a second submodule of said previous resolution module in said ordered chain, a third input for receiving from a submodule of said previous resolution module in said ordered chain a final value of the preceding subexpression of the same level corresponding to said previous resolution module and second logic means for operating in accordance with said second function on said value the comparison predicate of its corresponding subexpression, said first serial output of said second submodule of said previous resolution module and said present value of the first level subexpression corresponding to said previous resolution module to provide at its output a second current value of said given subexpression; and
   (3) selection means comprising first and second inputs connected respectively to said outputs of said first and second chaining elements, an output and a third input for receiving a signal indicative of the position of said resolution module in its logical group, said selections means responsive to said position signal for applying to its output said current value of said subexpression selected in accordance with said position signal said position signal indicative of which of said resolution modules is the last resolution module in the logical groups for receiving said values.

15. The apparatus as claimed in claim 14, wherein there is further included first inhibiting means connected to said output of said selection means and including an input for receiving a first position signal indicative that said present resolution module does not correspond to the comparison predicate positioned last within a first or second level subexpression X, said first inhibiting means for inhibiting the application to said second output of said selected current value of said subexpression in response to said first position signal, and second inhibiting means connected to said output of said selection means and including an input for receiving a second position signal indicative that said present resolution module does correspond to the comparison predicate positioned last within a first or second level subexpression, said second inhibiting means responsive to said second position signal for preventing the application of said selected current value of said subexpression to said first serial output in response to said second position signal.

16. The apparatus as claimed in claim 15, wherein each resolution module has a parallel module output, and there is further included module selection means connected in parallel to said second output of each of said first and second submodules to supply a chosen one of said current values of said subexpression to said parallel module output.

17. The apparatus as claimed in claim 16, wherein there is further included final query resolution means connected to each of said parallel module outputs of said plurality of resolution modules for operating on said final value of each subexpression to provide a final value of said expression.

18. Apparatus for repetitively performing a comparison operation in accordance with a predicate operator code (comprising equal to, greater than, or less than) on at least one data word with respect to an operand word to provide values of comparison predicates (comprising true or false) and then evaluating an expression comprised of at least first and second subexpressions connected logically by at least one first expression operator of a first level, said first subexpression comprised of third and fourth subsubexpressions connected logically by at least one second expression operator of a second level lower than said first level, said third subsubexpression comprised of fifth and sixth subsubsubexpressions connected by at least one third expression operator of a third level lower than said second level, said first and third expression operators being of the same type and opposite to that of said second expression operators, each of said subexpressions, subsubexpressions and subsubsubexpressions including one of said comparison predicates of a corresponding value and said operand word and instantiated by a set of data comprising at least said data word, said apparatus comprising:

a) a plurality of N comparator modules, each comparator module corresponding to one of said comparison predicates and comprising an input for receiving said data word to be processed, and comparator means for comparing in accordance with a predicate code said data word with said operand word, and for generating in accordance with said comparison a value of said comparison predicate at an output, said respective inputs of said plurality of N comparator modules being arranged to receive said data word in parallel with respect to each other, said respective outputs of said plurality of N comparator modules being arranged to output said respective values of said comparison predicates in parallel with each other;

b) a plurality of N resolution modules interconnected serially in an ordered chain defined by said expression, each resolution module corresponding to one of said comparison predicates and to a subexpression or subsubexpression including said one comparison predicate, each of said resolution modules comprising first and second submodules, said first and second submodules dedicated respectively to performing first and second logical functions determined by corresponding ones of said expression operators associated with its respective subexpression or subsubexpression on the corresponding values of said comparison predicates of its corresponding subexpressions and subsubexpressions of said first and second levels;

c) a plurality of logical groups of said resolution modules, each logical group including at least one resolution module and related to a corresponding one of said subexpressions; and d) first and second sets of resolution elements, said first submodule comprising a first resolution element of said first set and a second resolution element of said second set, said second submodule comprising a third resolution element of said first set and a fourth resolution element of said second set, said first set of resolution elements dedicated to operating on said subsubexpressions of said second level to provide final evaluations thereof and said second set of resolution elements dedicated to operating on said subsubsubexpressions of said third level to provide final evaluations thereof, e) each resolution element including a first input coupled to said output of its corresponding comparator module for receiving said value of the comparison predicate of its corresponding subsubexpression or subsubsubexpression, said respective first inputs of said resolution elements being arranged in parallel with respect to each other, a first serial output for providing a current evaluation of its corresponding subexpression, a second output for providing a final evaluation of said subexpression for a resolution element of said first set and of said subsubsubexpression for a resolution element of said second set, said respective second outputs of said resolution elements being arranged in parallel with respect to each other, a second serial input for receiving a current evaluation of said given subexpression, and logic means for operating on one function of said first and second functions corresponding to its submodule on said value of its corresponding comparison predicate and said current evaluation of said given subexpressions to provide a new current evaluation of said given subexpression, said second serial input of each resolution element is connected to said first serial output of a resolution element of said same set and of a corresponding one of said first and second submodules within a previous resolution module in said ordered chain, said first and third resolution elements further comprising a third input for receiving a final evaluation of a subsubsubexpression of said second level, said third input of said first and third resolution elements being connected respectively to said second parallel outputs of said second and fourth resolution elements.

19. The evaluating apparatus as claimed in claim 18, wherein each of said resolution elements comprises a fourth input for receiving an inhibiting signal indicative of that last input value within a subexpression of a corresponding level for applying said new current evaluation to its second parallel output, and a fifth input for receiving an inhibiting signal indicative of that last input value of a subexpression of a corresponding level and of those resolution modules of said second level without input values for preventing the application of said new current evaluation of said given subexpression to said first serial output.

20. The evaluating apparatus as claimed in claim 19, wherein there is further included final query resolution means connected to said second parallel output of each of said first and third resolution elements of each resolution module for operating in parallel on said final value of each said subexpressions to provide a final value of said expression.

* * * * *